US011908418B2

(12) United States Patent
Lee et al.

(10) Patent No.: US 11,908,418 B2
(45) Date of Patent: Feb. 20, 2024

(54) DISPLAY PANEL, DISPLAY DEVICE INCLUDING THE SAME, AND METHOD FOR OPERATING THE SAME

(71) Applicant: LG DISPLAY CO., LTD., Seoul (KR)

(72) Inventors: Minjic Lee, Paju-si (KR); Yeseul Han, Gimpo-si (KR); Jeongok Jo, Seoul (KR); Kwanghyun Choi, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/836,757

(22) Filed: Jun. 9, 2022

(65) Prior Publication Data

US 2023/0026011 A1 Jan. 26, 2023

(30) Foreign Application Priority Data

Jul. 20, 2021 (KR) ........................ 10-2021-0095070

(51) Int. Cl.

*G09G 3/3266* (2016.01)
*G09G 3/3291* (2016.01)
*G09G 3/3233* (2016.01)
*G09G 3/3225* (2016.01)

(52) U.S. Cl.

CPC ......... *G09G 3/3266* (2013.01); *G09G 3/3291* (2013.01); *G09G 2310/0297* (2013.01); *G09G 2310/08* (2013.01); *G09G 2320/0247* (2013.01)

(58) Field of Classification Search

None

See application file for complete search history.

(56) References Cited

U.S. PATENT DOCUMENTS

| | | | | |
|---|---|---|---|---|
| 7,852,437 B2 * | 12/2010 | Lee | G02F 1/133514 349/139 |
| 9,024,979 B2 * | 5/2015 | Lee | G09G 3/3648 345/690 |
| 9,774,325 B2 | 9/2017 | Kim et al. | |
| 2007/0070258 A1 * | 3/2007 | Kinoshita | H04N 5/04 348/790 |

(Continued)

FOREIGN PATENT DOCUMENTS

| | | |
|---|---|---|
| CA | 111243441 A | 6/2020 |
| CN | 110517636 A | 11/2019 |

(Continued)

OTHER PUBLICATIONS

GB Office Action dated Dec. 22, 2022 issued in Patent Application No. GB2208977.5 (9 pages).

*Primary Examiner* — Sepehr Azari
(74) *Attorney, Agent, or Firm* — POLSINELLI PC

(57) ABSTRACT

A the display panel includes a plurality of sub-pixels arranged in rows and columns; one scan line disposed in each of the rows of the plurality of sub-pixels; two data lines are disposed in each of the columns of the plurality of sub-pixels; a first multiplexer configured to select a data line at one side among the two data lines disposed in each column; and a second multiplexer configured to select a data line at another side among the two data lines disposed in each column that can be operated at a high speed using a 2D1G structure as well as at a low speed in an interlace scheme, thus securing 2H sensing time and removing flickering during switching between operations of pixels.

26 Claims, 19 Drawing Sheets

(56) References Cited

U.S. PATENT DOCUMENTS

| | | | | |
|---|---|---|---|---|
| 2008/0100760 | A1* | 5/2008 | Lee | G02F 1/133514 349/37 |
| 2011/0043688 | A1* | 2/2011 | Wang | H04N 7/013 348/E7.003 |
| 2013/0271436 | A1* | 10/2013 | Shiomi | G09G 3/36 345/204 |
| 2015/0061983 | A1 | 3/2015 | Kim | |
| 2019/0164494 | A1* | 5/2019 | Bae | G09G 3/3233 |
| 2019/0385522 | A1* | 12/2019 | Song | G09G 3/3266 |
| 2020/0380903 | A1* | 12/2020 | Dong | G09G 3/3225 |
| 2020/0410939 | A1 | 12/2020 | Li et al. | |
| 2021/0110760 | A1* | 4/2021 | Lee | G09G 3/32 |
| 2021/0356785 | A1* | 11/2021 | Yuan | G09G 3/3685 |
| 2022/0327974 | A1 | 10/2022 | Dong et al. | |
| 2023/0050569 | A1 | 2/2023 | Dong et al. | |

FOREIGN PATENT DOCUMENTS

| | | | |
|---|---|---|---|
| CN | 111627393 | A | 9/2020 |
| KR | 2013-0102186 | A | 9/2013 |
| KR | 2016-0074716 | A | 6/2016 |

* cited by examiner

DISPLAY PANEL, DISPLAY DEVICE INCLUDING THE SAME, AND METHOD FOR OPERATING THE SAME

CROSS-REFERENCE TO RELATED APPLICATION

This application claims the priority of Korean Patent Application No. 10-2021-0095070 filed on Jul. 20, 2021, which is hereby incorporated by reference in its entirety.

BACKGROUND

Field of the Disclosure

The present disclosure relates to a display device, and more particularly, to a display panel, a display device including the same and a method for operating the same. Although the present disclosure is suitable for a wide scope of applications, it is particularly suitable for the display device including the same and the method for operating the same in which both high-speed operation and low-speed operation on one pixel in a display device are achieved through a two data lines and one gate line (2D1G) structure.

Description of the Background

In general, an organic light-emitting display device has an organic electroluminescent diode (OLED) disposed in a display panel and having high luminance and low operating voltage characteristics, In addition, it is a self-luminous type device in which the device also emits light by itself. Therefore, a contrast ratio thereof is high. The organic light-emitting display device is able to implement an ultra-thin display. Further, a response time thereof is several micro-seconds (μs), thus making it easy to implement a moving image. There is no restriction on a viewing angle. Further, the device has stable characteristics at low temperatures.

The organic electroluminescent diode (OLED) has an anode electrode connected to a drain electrode of a driving thin-film transistor Tdr, a cathode electrode connected to a ground VSS, and an organic light-emitting layer formed between the cathode electrode and the anode electrode.

In the organic light-emitting display device as described above, when data voltage Vdata is applied to a gate electrode of the driving thin-film transistor Tdr, a drain-source current flows based on a gate-source voltage Vgs and is supplied to the organic electroluminescent diode. The organic light-emitting display device displays a gray level of an image by the driving thin-film transistor controlling an amount of current flowing through the organic electroluminescent diode.

In the above-described organic light-emitting display device, a TFT element mounted in each pixel controls an amount of the current applied to the OLED element to control brightness of a self-emitting OLED. In this regard, a dimming scheme is used in which as luminance decreases, a light-emitting time is linearly reduced.

In the dimming scheme, when the organic light-emitting display device receives luminance data from an external system and selects one gamma group corresponding to the luminance data from among a plurality of gamma groups, dimming data corresponding to the selected gamma group is provided to the OLED element.

However, the organic light-emitting display device operates in a progressive scheme in a low-frequency (30 Hz)

operation mode, and operates in a interlace scheme in a high-frequency (60 to 120 Hz) operation mode.

In the progressive scheme, the device operates at 30 Hz for each of two half frames per 1 frame. A scan operation is performed for a first half (½) frame ($1^{st}$ field) and a skip operation is performed for a second half (½) frame ($2^{nd}$ field).

In this regard, for the first half frame, the luminance starts at 0% and increases rapidly to 50%, then gradually increases in a range above 50%. Then, the luminance increases to 100% for the second half frame.

However, when a next frame starts, the luminance starts at 0% again. Therefore, in the low-frequency operation, the luminance increases to 100% at an end of one frame and then suddenly drops to 0% at the next frame. Thus, there is a problem that flicker occurs.

Further, in the interlace scheme, the device operates at 60 Hz on a half frame basis. For a first half frame (first field), an odd-numbered line is scanned, while an even-numbered line is skipped. Then, for a second half frame (second field), the odd-numbered line is skipped, while the even-numbered line is scanned.

In this regard, the luminance for the first half frame has the same pattern as that for the second half frame. The luminance starts at 50% at beginning of each of the half frames and gradually increases and eventually reaches 100% at end of each of the half frames.

However, when a next half frame starts, the luminance will start again at 50%. Therefore, in the high frequency operation, the luminance increases to 100% at the end of one half frame and then suddenly drops to 50% at the next half frame. Thus, there is a problem that flickering occurs.

The above information disclosed in this Background section is only for enhancement of understanding of the background of the described technology and therefore it may contain information that does not form prior art that is already known to a person of ordinary skill in the art.

SUMMARY

Accordingly, in order to solve the above-mentioned problems, the present disclosure has invented a display panel in which two data lines and one gate line are disposed in one pixel and the device operates in an interlace scheme in a low speed mode, and operates in a progressive scheme in a high speed mode.

The present disclosure is also to provide a display device including a display panel in which a two-horizontal periods sensing operation is performed for the high-speed operation and the flicker problem is removed for the low-speed operation.

Further, the present disclosure is to provide a method for operating a display device in which in an interlace operation, data inputs of each of two consecutive pixels in a column direction are respectively connected to a data line at one side (Left) and a data line at the other side (Right), and in a progressive operation, a scan signal is inputted to first to fourth scan lines in an order of the first, third, second, and fourth scan lines, and in the interlace operation, an odd-numbered frame is activated for a first half frame, and an even-numbered frame is activated for a second half frame.

The present disclosure is not limited to the above-mentioned features. Other features and advantages according to the present disclosure that are not mentioned may be understood based on following descriptions, and may be more clearly understood according to aspects according to the present disclosure. Further, it will be easily understood that the purposes and advantages according to the present disclosure may be realized using means shown in the claims and combinations thereof.

A display panel according to an aspect of the present disclosure includes a plurality of sub-pixels arranged in rows and columns; a plurality of scan lines arranged such that one scan line is disposed in each of the rows of the plurality of sub-pixels; a plurality of data lines arranged such that two data lines are disposed in each of the columns of the plurality of sub-pixels; a first multiplexer configured to select a data line at one side among the two data lines disposed in each column; and a second multiplexer configured to select a data line at the other side among the two data lines disposed in each column.

In addition, a display device according to an aspect of the present disclosure includes a display panel including: a plurality of sub-pixels arranged in rows and columns; a plurality of scan lines arranged such that one scan line is disposed in each of the rows of the plurality of sub-pixels; a plurality of data lines arranged such that two data lines are disposed in each of the columns of the plurality of sub-pixels; a first multiplexer configured to select a data line at one side among the two data lines disposed in each column; a second multiplexer configured to select a data line at the other side among the two data lines disposed in each column; each of first and second scan switches for switching the scan line disposed in each row to be connected to the data line at the one side disposed in each column; and each of third and fourth scan switches for switching the scan line disposed in each row to be connected to the data line at the other side disposed in each column; a scan driver for applying a scan signal to the plurality of gate lines; a data driver for applying a data signal to the plurality of data lines; a power supply for providing a high-potential voltage, a low-potential voltage, and an initialization voltage to each of the sub-pixels; and a timing controller for controlling the scan driver and the data driver, wherein pairs of the first and second scan switches and pairs of the third and fourth scan switches are alternatively arranged with each other in the column direction of the sub-pixels and in a zig-zag manner.

Also, a display device according to an aspect of the present disclosure operates in an interlace operation scheme. In this regard, a display panel of the display device includes one scan line disposed in each of rows of a plurality of sub-pixels, and two data lines respectively disposed at one side and the other side and in each of columns of the plurality of sub-pixels. A method for operating the display device includes, for a first half frame, turning a first multiplexer switch on to apply a data voltage to a sub-pixel corresponding to an odd-numbered scan line through the data line at one side; and for a second half frame, turning a second multiplexer switch on to a data voltage to a sub-pixel corresponding to an even-numbered scan line through the data line at the other side.

Further, a display device according to an aspect of the present disclosure operates in a progressive operation scheme. In this regard, a display panel of the display device includes one scan line disposed in each of rows of a plurality of sub-pixels, and two data lines respectively disposed at one side and the other side and in each of columns of the plurality of sub-pixels. A method for operating the display device includes, for one frame or one half frame, turning on a first scan switch connected to the data line at one side so as to apply a data voltage to a sub-pixel of a first scan line; turning on a third scan switch connected to the data line at the other side so as to apply a data voltage to a sub-pixel of a third scan line; turning on a second scan switch connected to the data line at one side so as to apply a data voltage to a sub-pixel of a second scan line; and turning on a fourth scan switch connected to the data line at the other side so as to apply a data voltage to a sub-pixel of a fourth scan line.

According to an aspect of the present disclosure, data inputs of each of two pixels consecutively arranged in a column direction are respectively connected to a data line at one side and a data line at the other side. Thus, the device may operate in an interlace scheme.

Further, according to the present disclosure, when the device operates in an interlace scheme, a plurality of sub-pixels are grouped into an odd-numbered frame group and an even-numbered frame group, and a data voltage is applied to sub-pixels corresponding to the odd-numbered frame group for a first half frame, and a data voltage is applied to sub-pixels corresponding to the even-numbered frame group for a second half frame.

Further, according to the present disclosure, when the device operates in a progressive scheme, the device operates on a 4 scan lines basis such that the data voltage may be input to first to fourth scan lines in an order of the first line, the third line, the second line, and the fourth line.

Therefore, according to the present disclosure, a sensing time may increase due to a two horizontal periods (2H) operation, thereby achieving high-speed operation.

Moreover, according to the present disclosure, during a low-frequency operation for an interlace operation, the flicker may be removed.

Effects of the present disclosure are not limited to the above-mentioned effects, and other effects as not mentioned will be clearly understood by those skilled in the art from following descriptions.

In addition to the above-described effects, specific effects of the present disclosure will be described together while describing specific details for carrying out the present disclosure below.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
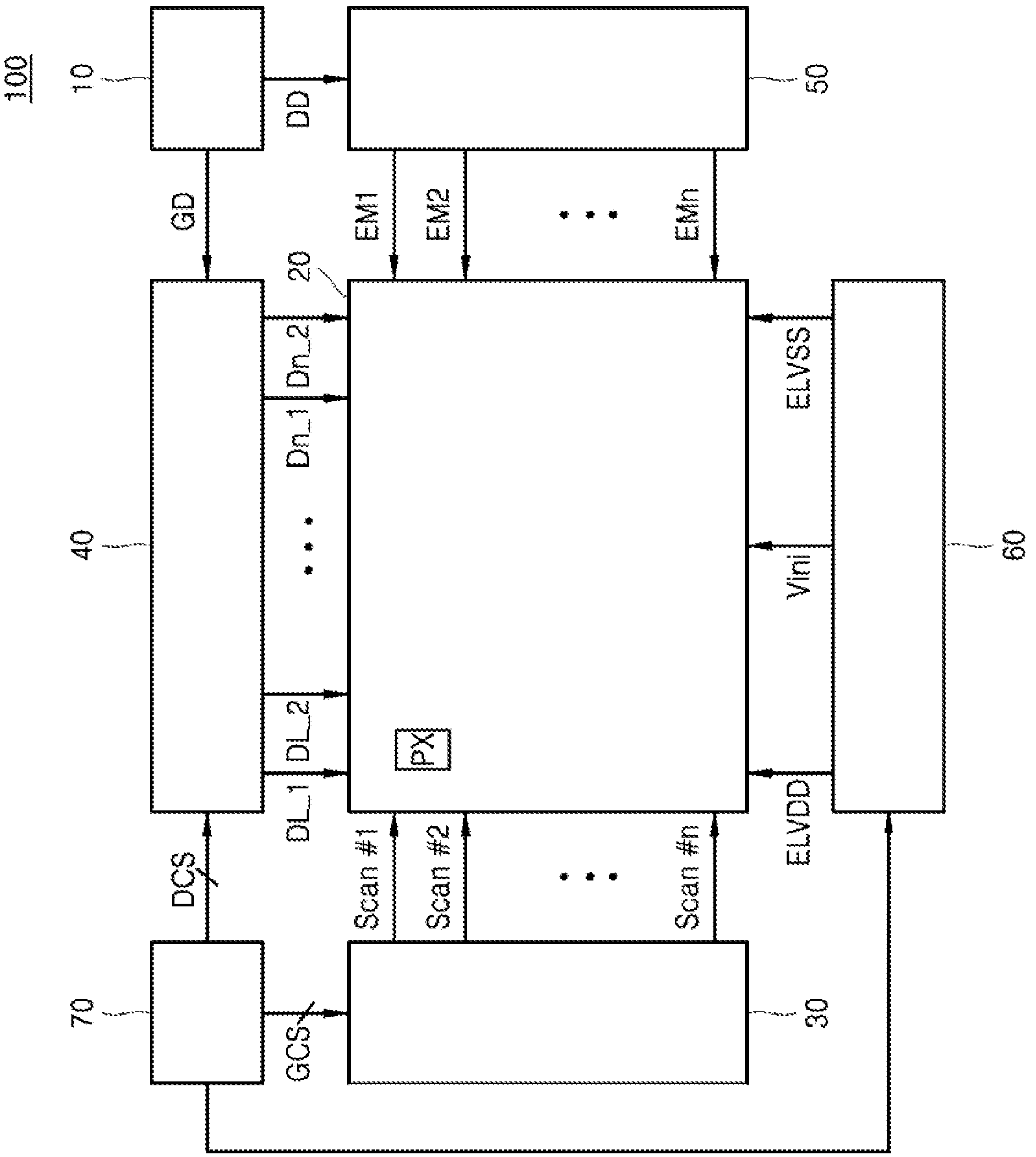
FIG. 1 is a configuration diagram schematically showing an overall configuration of a display device according to an aspect of the present disclosure.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various aspects are illustrated and described further below. It will be understood that the description herein is not intended to limit the claims to the specific aspects described. On the contrary, it is intended to cover alternatives, modifications, and equivalents as may be within the spirit and scope of the present disclosure as defined by the appended claims.

A shape, a size, a ratio, an angle, a number, etc. disclosed in the drawings for describing aspects of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular aspects only and is not intended to limit the present disclosure. As used herein, the singular may constitute "a" and "an" are intended to include the plural may constitute as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The features of the various aspects of the present disclosure may be partially or entirely combined with each other, and may be technically associated with each other or operate with each other. An aspects may be implemented independently of each other and may be implemented together in an association relationship.

In interpreting a numerical value in the disclosure, an error range may be inherent even when there is no separate explicit description thereof.

In a description of a signal flow relationship, for example, when a signal is transmitted from a node A to a node B, the signal may be transmitted from the node A through a node C to the node B, unless an indication that the signal is transmitted directly from the node A to the node B is specified.

Hereinafter, a display panel according to some aspects of the present disclosure, a display device including the same, and a method for operating the same will be described.

Figure 2:
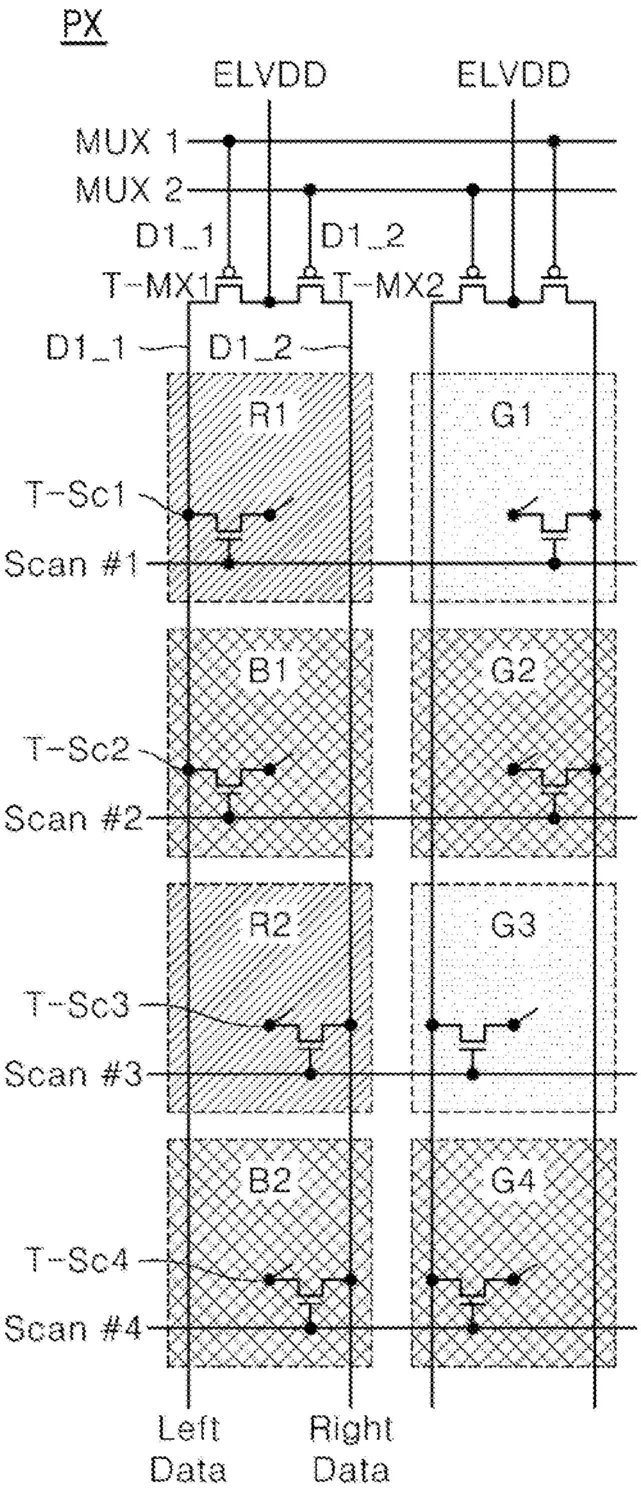
FIG. 2 is a schematic diagram showing a configuration of any pixel PX.

FIG. 1 is a schematic diagram showing an overall configuration of a display device according to an aspect of the present disclosure, and FIG. 2 is a schematic diagram showing a configuration of a pixel of the display device.

Referring to FIG. 1 to FIG. 2, a display device 100 according to an aspect of the present disclosure may include a luminance controller 10, a display panel 20, a scan driver 30, a data driver 40, a light-emission controller 50, a power supply 60 and a timing controller 70.

The luminance controller 10 may provide one gamma set selected from among a plurality of gamma sets each including a plurality of gamma data to the data driver 40, and provide dimming data corresponding to the selected gamma set to the light-emission controller 50.

The display panel 20 includes a plurality of pixels PX arranged in rows and columns.

In the display panel 20, a plurality of scan lines Scan #1 to Scan #n and a plurality of data lines D1_1, D1_2 to Dn_1, Dn_2 may intersect each other, and each pixel PX may be defined at each intersection therebetween. In this regard, each pixel PX may have sub-pixels. Each of the sub-pixels may include an organic electroluminescent diode (OLED).

For example, the display panel 20 may include a glass substrate or a plastic substrate, the plurality of scan lines Scan #1 to Scan #n and the plurality of data lines D1_1, D1_2 to Dn_1, Dn_2 disposed on the glass substrate or the plastic substrate, and intersecting each other, and sub-pixels R, G, and B corresponding to red, green, and blue, respectively, and respectively defined at the intersections between the scan lines Scan #1 to Scan #n and the data lines D1_1, D1_2 to Dn_1, Dn_2.

The plurality of scan lines Scan #1 to Scan #n may be arranged such that one scan line is disposed in each of rows composed of the plurality of sub-pixels, as shown in FIG. 2.

The plurality of data lines D1_1, D1_2 to Dn_1, and Dn_2 may be arranged such that two data lines are disposed in each of columns composed of the plurality of sub-pixels, as shown in FIG. 2.

The lines of the display panel 20 may be connected to the scan driver 30 and the data driver 40 disposed in an outer area of the display panel 20. Further, in the display panel 20, power voltage supply lines ELVDD, Vini, and ELVSS are disposed so as to extend in a direction parallel to the data lines D1_1, D1_2 to Dn_1, and Dn_2 and are connected to each sub-pixel.

Any pixel PX may include at least one sub-pixel R1, G1 to G2, and B1 as shown in FIG. 2. One sub-pixel G may include at least one sub-pixel G1 and G2.

In the display panel 20, one scan line Scan #1 is disposed in each row, and two data lines are disposed in each column. For example, a data line D1_1 may be disposed at one side (Left) and a data line D1_2 may be disposed at the other side (Right). That is, in one sub-pixel R1, one scan line Scan #1 and two data lines D1_1 and D1_2 are disposed.

The display panel 20 may include a first multiplexer MUX 1 that selects the data line D1_1 of one side (Left) among the two data lines disposed in each column, and a second multiplexer MUX 2 that selects the data line D1_2 of the other side (Right) among the two data lines disposed in each column.

The display panel 20 may include a first scan switch T-Sc1 that switches the scan line Scan #1 disposed in each row to be connected to the data line D1_1 of one side (Left) disposed in each column and, a second scan switch T-Sc2 that switches the scan line Scan #2 disposed in each row connection to be connected to the data line D1_1 of one side (Left) disposed in each column, a third scan switch T-Sc3 that switches the scan line Scan #3 disposed in each row to be connected to the data line D1_2 of the other side (Right) disposed in each column, and a fourth scan switch T-Sc4 that switches the scan line Scan #4 disposed in each row to be connected to the data line D1_2 of the other side (Right) disposed in each column. In this regard, each of the first scan switch T-Sc1 to the fourth scan switch T-Sc4 may be implemented as, for example, a thin-film transistor (TFT).

The first and second scan switches T-Sc1 and T-Sc2 may be respectively disposed in two sub sub-pixels consecutively arranged in a column direction along the data line D1_1 at one side (Left) among a plurality of sub sub-pixels, for example, a red first sub sub-pixel R1 and a blue first sub sub-pixel B1. In this regard, the two sub sub-pixels consecutively arranged in the column direction along the data line D1_1 of one side (Left) may be sub sub-pixels R1 and B1 of different colors, or sub sub-pixels G3 and G4 of the same color.

The third and fourth scan switches T-Sc3 and T-Sc4 may be respectively disposed in two sub sub-pixels consecutively arranged in the column direction along the data line D1_2 of the other side (Right) among the plurality of sub sub-pixels, for example, a red second sub sub-pixel R2 and a blue second sub sub-pixel B2. In this regard, the two sub sub-pixels consecutively arranged in the column direction along the data line D1_2 of the other side (Right) may be sub sub-pixels R2 and B2 of different colors, or sub sub-pixels G1 and G2 of the same color.

The first and second scan switches T-Sc1 and T-Sc2 and the third and fourth scan switches T-Sc3 and T-Sc4 may be arranged along the plurality of sub-pixels arranged in the column direction such that the first and second scan switches T-Sc1 and T-Sc2 may be disposed at a left side and the third and fourth scan switches T-Sc3 and T-Sc4 may be disposed at a right side.

The first multiplexer MUX 1 may include a first multiplexer switch T-MX1 in which a first electrode thereof is connected to the data line D1_1 of one side (Left), a gate electrode thereof is connected to a first multiplexer line MUX1 for applying a first selection signal, and a second electrode thereof is connected to first power ELVDD.

The first multiplexer switch T-MX1 is turned on as the first selection signal is applied to the gate electrode through the first multiplexer line MUX1. Thus, the first power ELVDD is applied via the second electrode is applied to the data line D1_1 of one side (Left) through the first electrode.

The second multiplexer MUX 2 may include a second multiplexer switch T-MX2 in which a first electrode thereof is connected to the data line D1_2 of the other side (Right), a gate electrode thereof is connected to a second multiplexer line MUX2 for applying a second selection signal, and a second electrode thereof is connected to the first power.

The second multiplexer switch T-MX2 is turned on as the second selection signal is applied to the gate electrode through the second multiplexer line MUX2. Thus, the first power ELVDD applied via the second electrode is applied to the data line D1_2 of the other side (Right) through the first electrode.

Further, each sub-pixel may include at least one organic electroluminescent diode OLED, a capacitor Cst, switching thin-film transistors T1 and T2 and a driving thin-film transistor Tdr. In this regard, the organic electroluminescent diode OLED may include a first electrode (hole injection electrode), an organic compound layer, and a second electrode (electron injection electrode).

The organic compound layer may include a light-emitting layer in which light is actually emitted, and may further include various organic layers for efficiently transferring carriers including holes or electrons to the light-emitting layer. These organic layers may include a hole injection layer and a hole transport layer positioned between the first electrode and the light-emitting layer, and an electron injection layer and an electron transport layer positioned between the second electrode and the light-emitting layer.

The scan driver 30 may apply a scan signal to the plurality of scan lines Scan #1 to Scan #n. For example, the scan driver 30 may sequentially apply a gate voltage to the sub-pixel on one horizontal line basis in response to a gate control signal GCS input thereto. The scan driver 30 may be implemented as a shift register having multiple stages that sequentially output a high-level gate voltage every one horizontal period H.

The data driver 40 may apply a data signal to the plurality of data lines D1_1, D1_2 to Dn_1, and Dn_2. For example, the data driver 40 receives an image signal of a digital waveform applied from the timing controller 70, converts the image signal into a data voltage as an analog voltage having a gray level value that each sub-pixel may process, and then supplies the data voltage to each sub-pixel through the data lines D1_1, D1_2 to Dn_1, Dn_2 in response to a data control signal DCS input thereto. In this regard, the data driver 40 may convert the image signal into the data voltage based on multiple reference voltages supplied from a reference voltage supplier (not shown).

Further, the data driver 40 may apply low-potential voltage ELVSS and initialization voltage Vini in a 30 Hz operation mode and low-potential voltage ELVSS and initialization voltage Vini in a 60 Hz operation mode to the display panel 120 such that the low-potential voltage ELVSS and initialization voltage Vini in a 30 Hz operation mode are different from low-potential voltage ELVSS and initialization voltage Vini in a 60 Hz operation mode. For example, the data driver 40 may provide the low-potential voltage ELVSS and the initialization voltage Vini having the same value to the display panel 20 in the 30 Hz operation mode. However, in the 60 Hz operation mode, the data driver 40 may provide the display panel 20 with the low-potential voltage ELVSS and the initialization voltage Vini different from the low-potential voltage ELVSS and the initialization voltage Vini in the 30 Hz operation mode. For example, in the 60 Hz operation mode the data driver 40 may provide the display panel 20 with the low-potential voltage ELVSS and the initialization voltage Vini such that a difference between the low-potential voltage ELVSS and the initialization voltage Vini is greater than or equal to a predefined reference.

Further, when the data driver 40 receives one selected gamma set from the luminance controller 10, the data driver provides the low-potential voltage ELVSS and the initialization voltage Vini corresponding to said one selected gamma set based on a look-up table to the display panel 20.

The light-emission controller 50 may apply light-emission control signals EM #1 to EM #n to the plurality of sub-pixels.

The power supply 60 may provide high-potential voltage ELVDD, low-potential voltage ELVSS, and initialization voltage Vini to each sub-pixel.

The timing controller 70 may control the scan driver 30 and the data driver 40. For example, the timing controller 70 receives an image signal, a clock signal, and timing signals such as vertical and horizontal synchronization signals from an external system, generates the gate control signal GCS and the data control signal DCS, based on the received signals, and provides respectively the gate control signal GCS and the data control signal DCS to the scan driver 30 and the data driver 40.

In this regard, the horizontal synchronization signal indicates a time it takes to display one line of a screen, and the vertical synchronization signal indicates a time it takes to display a screen of one frame. Further, the clock signal refers to a signal on which control signals of a gate and each of the drivers are generated based.

In one example, the timing controller 70 may be connected to an external system through a predetermined interface and may receive an image-related signal and a timing signal output therefrom at high speed without noise. The interface may include an LVDS (Low Voltage Differential Signal) scheme interface or a TTL (Transistor-Transistor Logic) scheme interface.

Figure 3:
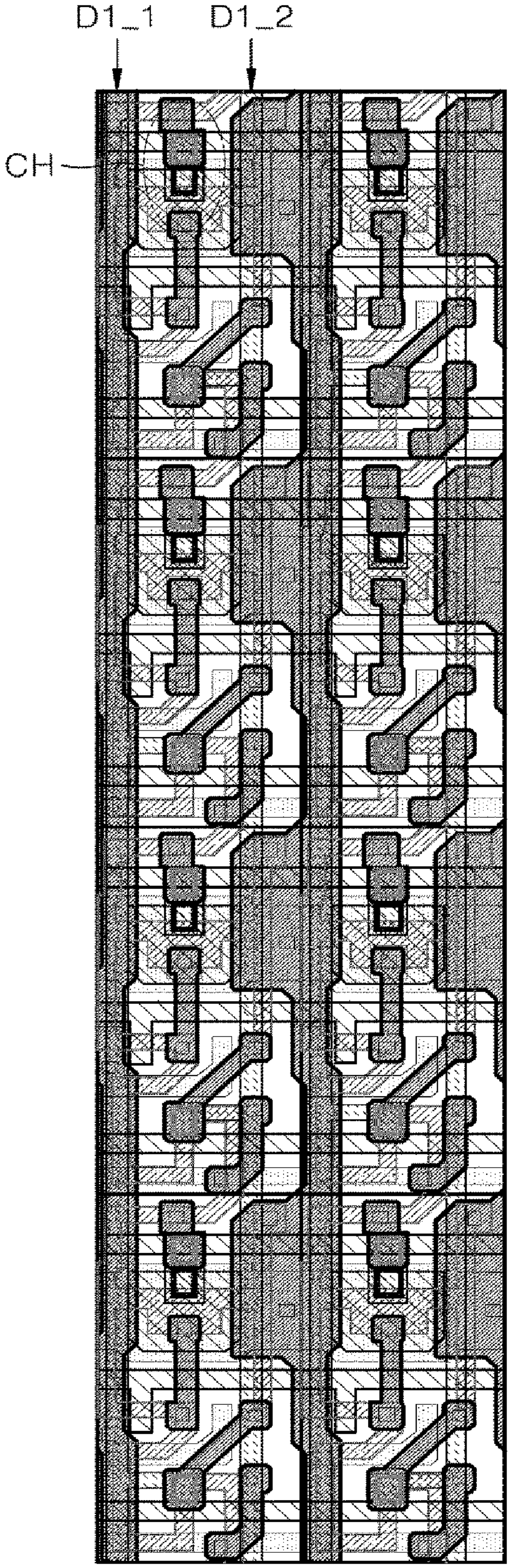
FIG. 3 is a plan view showing an example in which two data lines are disposed in each column in a display panel according to an aspect of the present disclosure.
Figure 4:
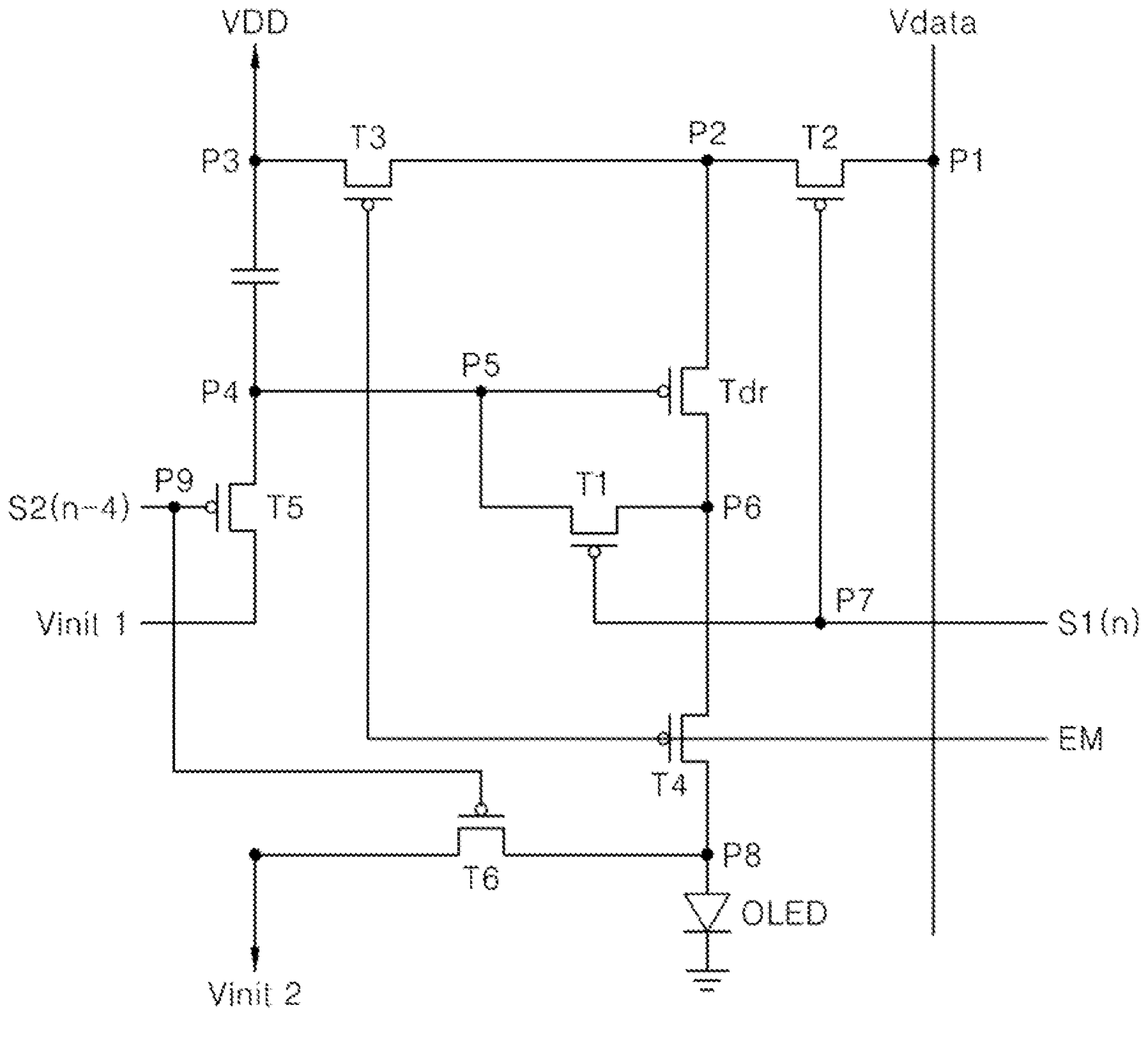
FIG. 4 is a circuit diagram showing an example of a circuit configuration of one sub-pixel in a display panel according to an aspect of the present disclosure.

FIG. 3 is a plan view showing an example in which two data lines are disposed in each column in a display panel according to an aspect of the present disclosure, and FIG. 4 is a circuit diagram showing a circuit configuration example of one sub-pixel in a display panel according to an aspect of the present disclosure.

Referring to FIG. 3, in a display panel 20 according to an aspect of the present disclosure, the two data lines disposed in each column, that is, the data line D1_1 of one side (Left), and the data line D1_2 of the other side (Right) may be electrically connected to thin-film transistors T-Sc2 and T-Sc3 via data contact holes CH, respectively.

Referring to FIG. 4, in the display panel 20 according to an aspect of the present disclosure, one sub-pixel may include a plurality of thin-film transistors T1 to T6, an organic electroluminescent diode OLED, a driving thin-film transistor Tdr, and an internal compensation circuit.

In this regard, the organic electroluminescent diode OLED may be simply referred to as 'light-emitting diode OLED', 'light-emitting diode EL', 'light-emitting element EL', 'EL' or 'OLED'. Further, the driving thin-film transistor Tdr may be referred to as 'driving transistor Tdr' or 'driving switch Tdr'.

The thin-film transistors T1 to T6 and Tdr included in the pixel PX may be implemented as PMOS-type LTPS (Low Temperature Poly Silicon) TFT. Thus, desired response characteristics may be secured. For example, at least one transistor among the thin-film transistors T1 to T6 may be implemented as an NMOS type or a PMOS type oxide TFT with good leakage current characteristics when being turned off, while each of the remaining transistors may be implemented as a PMOS type LTPS TFT with good response characteristics.

The OLED emits light based on an amount of current adjusted based on a gate-source voltage Vgs of the driving thin-film transistor Tdr. An anode electrode of the OLED is connected to a node P8, and a cathode electrode of the OLED is connected to low-potential power voltage ELVSS. An organic compound layer is formed between the anode electrode and the cathode electrode.

The organic compound layer may include a hole injection layer HIL, a hole transport layer HTL, a layer emission layer EML, an electron transport layer ETL, and an electron injection layer EIL. However, the present disclosure is not limited thereto. For example, two or more organic compound layers emitting different colors may be stacked according to a tandem structure. When a current flows through the light-emitting diode OLED, holes passing through the hole transport layer HTL and electrons passing through the electron transport layer ETL move to the light-emitting layer EML and are combined with each other therein to form excitons. As a result, the light-emitting layer EML emits visible light.

The driving thin-film transistor Tdr is a driving element that controls current flowing through the OLED based on the gate-source voltage Vgs thereof. The driving thin-film transistor Tdr may have a gate electrode connected to a node P5, one of first and second electrodes connected to a node P2 and the other thereof connected to a node P6. The gate-source voltage Vgs of the driving transistor Tdr refers to a voltage across the node P5 and the node P6.

Further, the first thin-film transistor T1 operating based on an n-th first scan signal S1(*n*) may be connected to and disposed between the node P5 and the node P6. That is, the first thin-film transistor T1 is configured such that one of first and second electrodes thereof is connected to the node P5 and the other thereof is connected to the node P6, and a gate electrode thereof is connected to a line for receiving the n-th first scan signal S1(*n*).

Further, the second thin-film transistor T2 connected to a data line Vdata may be connected to the node P2. That is, the second thin-film transistor T2 is configured such that one of first and second electrodes thereof is connected to the data line Vdata (at P1), and the other thereof is connected to the node P2, and a gate electrode thereof is connected to a line for receiving the n-th first scan signal S1(*n*).

Accordingly, the first thin-film transistor T1 and the second thin-film transistor T2 are turned on based on the n-th first scan signal S1(*n*).

Further, the gate electrode of the driving transistor Tdr may be connected to one electrode P4 of the storage capacitor Cst. The other electrode P3 of the storage capacitor Cst may be connected to first power, that is, high-potential power VDD.

Further, the third thin-film transistor T3 may be connected to and disposed between the first electrode P2 of the driving transistor Tdr and the other electrode P3 of the storage capacitor Cst. That is, the third thin-film transistor T3 is configured such that one of a first electrode and a second electrode thereof is connected to the node P2, the other thereof is connected to the node P3, and a gate electrode thereof is connected to a line for receiving a light-emission control signal EM.

Further, the fourth thin-film transistor T4 may be connected to and disposed between the second electrode P6 of the driving transistor Tdr and the anode electrode P8 of the OLED. That is, the fourth thin-film transistor T4 is configured such that one of a first electrode and a second electrode thereof is connected to the node P6, the other thereof is connected to the node P8, and a gate electrode thereof is connected to a line for receiving the light-emission control signal EM.

Accordingly, the third thin-film transistor T3 and the fourth thin-film transistor T4 are turned on based on the light-emission control signal EM.

Further, the fifth thin-film transistor T5 may be connected to one electrode P4 of the storage capacitor Cst. That is, the fifth thin-film transistor T5 is configured such that one of first and second electrodes is connected to the node P4, the other thereof is connected to a first initialization voltage line Vini1, and a gate electrode P9 thereof is connected to a line to which an (n−4)-th second scan signal S2(*n*−4) is applied.

Further, the sixth thin-film transistor T6 may be connected to the anode electrode P8 of the OLED. That is, the sixth thin-film transistor T6 is configured such that one of first and second electrodes is connected to the node P8, the other thereof is connected to a second initialization voltage line Vini2, and a gate electrode thereof is connected to a line to which the (n−4)-th second scan signal S2(*n*−4) is applied.

The compensation circuit may be configured for sampling the gate-source voltage Vgs in order to compensate for change in a threshold voltage of the driving transistor Tdr, and may be configured to include the first to sixth thin-film transistors T1 to T6 and the storage capacitor Cst.

The driving transistor Tdr may control current flowing through the light-emitting diode OLED based on the data signal Vdata. In this regard, luminance of the OLED may be adjusted based on a magnitude of the current. The third and fourth thin-film transistors T3 and T4 as light-emission control transistors may be connected to the driving transistor Tdr and the light-emitting diode OLED to control light emission of the OLED.

Specifically, in response to the light-emission control signal EM supplied from a light-emission control line, the third and fourth thin-film transistors T3 and T4 as the light-emission control transistors are turned on, such that the current flowing through the driving transistor Tdr is transmitted to the OLED so that the OLED may emit light. When the third and fourth thin-film transistors T3 and T4 are turned off, the current flowing through the driving transistor Tdr is not transmitted to the OLED, and thus the OLED may not emit light.

As described above, luminance of the display device may be determined based on a magnitude of current supplied from the driving transistor Tdr and a time duration for which the light-emission control transistors T3 and T4 are turned on.

Figure 5:
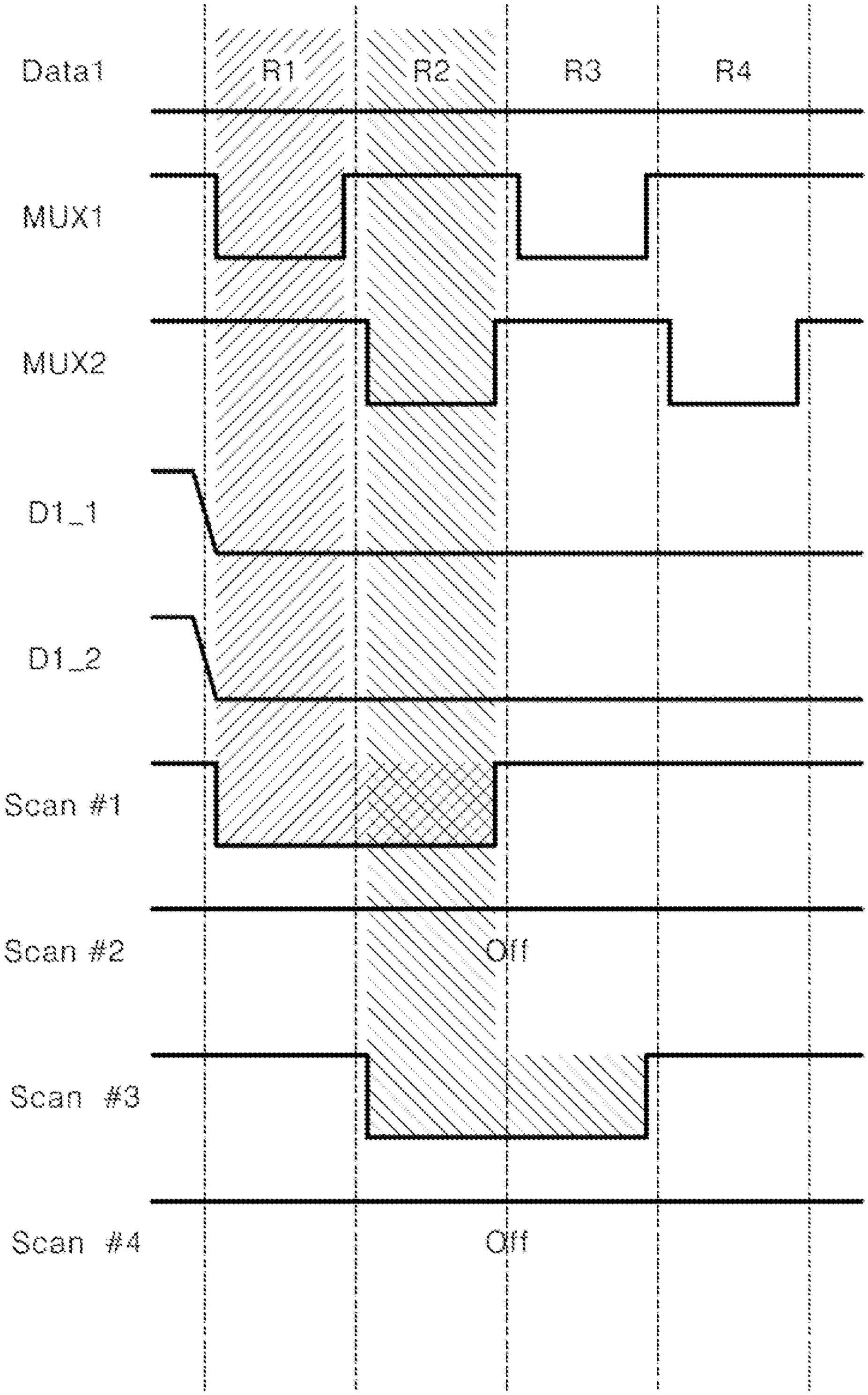
FIG. 5 is a diagram showing an interlace scheme operation timing diagram of a display panel according to an aspect of the present disclosure.

FIG. 5 is a diagram showing an interlace scheme operation timing diagram of a display panel according to an aspect of the present disclosure.

Referring to FIG. 2, FIG. 4 and FIG. 5, the display panel 20 according to an aspect of the present disclosure operates in an interlace scheme. In this case, one frame is divided into a first half frame and a second half frame. For the first half frame, sub sub-pixels R1 and R2 disposed in an odd-numbered row operate, and for the second half frame, sub sub-pixels B1 and B2 disposed in an even-numbered row operate.

That is, the display panel 20 activates an odd-numbered frame for the first half frame of a single frame, and activates an even-numbered frame for the second half frame of the single frame.

For example, for the first half frame, the first multiplexer MUX1 is turned on based on a low signal, and the second multiplexer MUX2 is turned off based on a high signal. A low signal is applied to both the data line D1_1 of one side (Left) and the data line D1_2 of the other side (Right). In this regard, an (n−1)-th first scan signal Scan #1 as a low signal is applied to a scan line for two horizontal periods (2H). Accordingly, the first scan switch T-Sc1 is turned on, and thus, a low signal from the data line D1_1 of one side (Left) is applied to a red first sub sub-pixel R1 disposed in an odd-numbered first row. Accordingly, the red first sub sub-pixel R1 disposed in the odd-numbered first row operates to emit light.

Thereafter, the first multiplexer MUX1 is turned off based on a high signal, and the second multiplexer MUX2 is turned on based on a low signal. A low signal is applied to both the data line D1_1 of one side (Left) and the data line D1_2 of the other side (Right). In this regard, an n-th third scan signal Scan #3 as a low signal is applied to the scan line for two horizontal periods (2H). Accordingly, the third scan switch T-Sc3 is turned on, and thus, a low signal from the data line D1_2 of the other side (Right) is applied to a red second sub-pixel R2 disposed in an odd-numbered third row. Accordingly, the red second sub sub-pixel R2 disposed in the odd-numbered third row operates to emit light.

In this regard, the (n−1)-th first scan signal Scan #1 has a low level for first two horizontal periods (2H). When a signal applied to the second multiplexer MUX2 is switched from a high signal to a low signal, the n-th third scan signal Scan #3 is at a low level state for two horizontal periods (2H). That is, when an operation of the first sub sub-pixel R1 is switched to an operation of the second sub-pixel R2, a low level of the (n−1)-th first scan signal Scan #1 and a low level of the n-th third scan signal Scan #3 overlap each other for a one horizontal period (1H). Therefore, when an operation of the first sub sub-pixel R1 is switched to an operation of the second sub sub-pixel R2, flicker phenomenon does not occur.

In one example, for the second half frame, the first multiplexer MUX1 is turned on based on a low signal, and the second multiplexer MUX2 is turned off based on a high signal. A low signal is applied to both the data line D1_1 of one side (Left) and the data line D1_2 of the other side (Right). In this regard, a (n+1)-th second scan signal Scan #2 as a low signal is applied to the scan line for two horizontal periods (2H). Accordingly, the second scan switch T-Sc2 is turned on, and thus, a low signal from the data line D1_1 of one side (Left) is applied to a blue first sub-pixel B1 disposed in an even-numbered second row. Accordingly, the blue first sub sub-pixel B1 disposed in the even-numbered second row operates to emit light.

Thereafter, the first multiplexer MUX1 is turned off based on a high signal, and the second multiplexer MUX2 is turned on based on a low signal. A low signal is applied to both the data line D1_1 of one side (Left) and the data line D1_2 of the other side (Right). In this regard, an (n+2)-th fourth scan signal Scan #4 as a low signal is applied to the scan line for two horizontal periods (2H). Accordingly, the fourth scan switch T-Sc4 is turned on, and thus, a low signal from the data line D1_2 of the other side (Right) is applied to a red second sub-pixel B2 disposed in an even-numbered fourth row. Accordingly, the red second sub sub-pixel B2 disposed in the even-numbered fourth row operates to emit light.

In this regard, the (n+1)-th second scan signal Scan #2 is at a low level state for two horizontal periods (2H). When a signal applied to the second multiplexer MUX2 is switched from a high signal to a low signal, the (n+2)-th fourth scan signal Scan #4 is at a low level state for two horizontal periods (2H). That is, when an operation of the blue first sub-pixel B1 is switched to an operation of the blue second sub-pixel B2, a low level of the (n+1)-th second scan signal Scan #2 and a low level of the (n+2)-th fourth scan signal Scan #4 overlap each other for a one horizontal period (1H). Therefore, when an operation of the blue first sub sub-pixel B1 is switched to an operation of the blue second sub sub-pixel B2, the flicker phenomenon does not occur.

As described above, in the display panel 20 according to an aspect of the present disclosure, when the display panel 20 operates in the interlace scheme, the flicker may not occur when an operation of one sub-pixel is switched to an operation of another sub-pixel.

Figure 6:
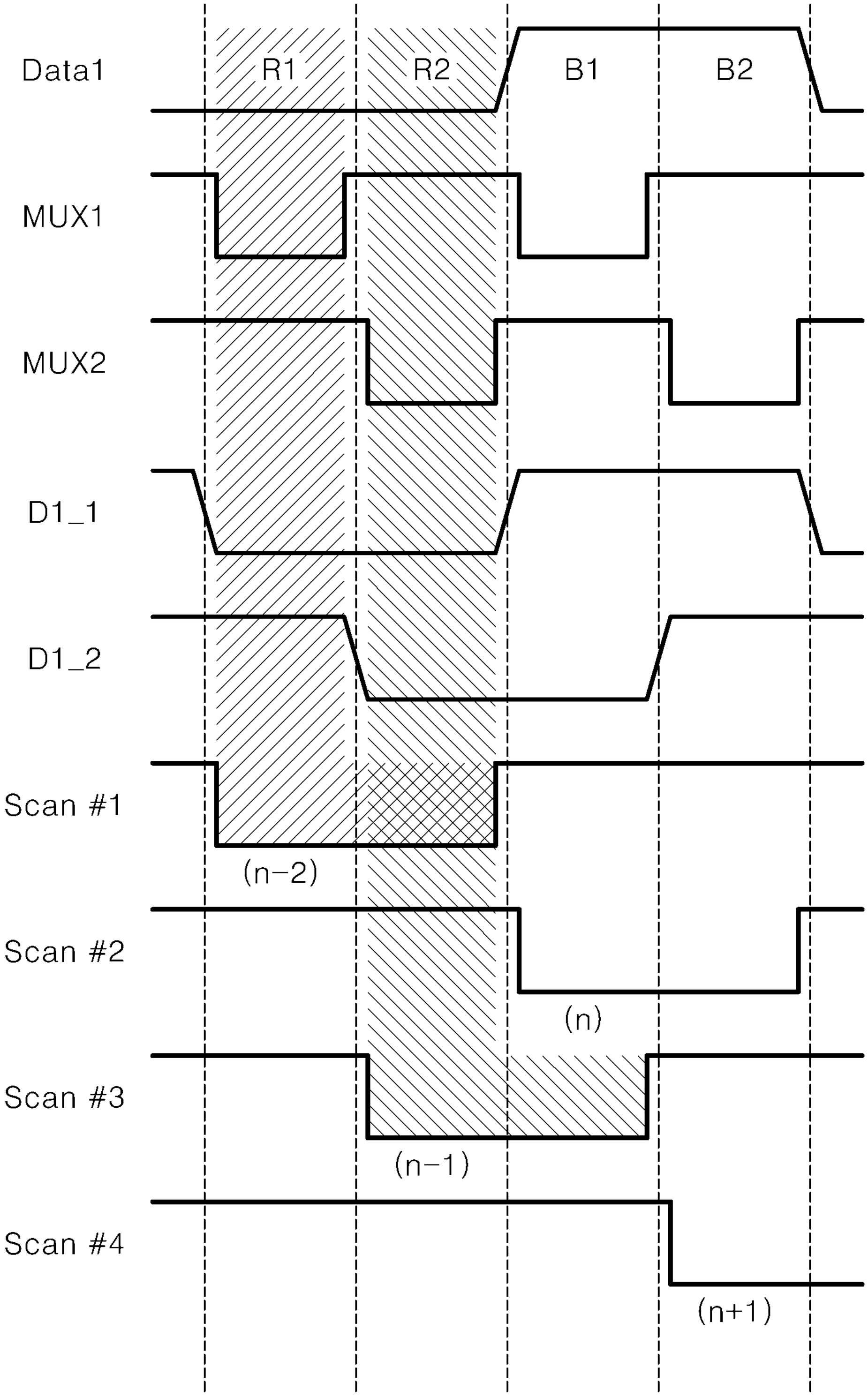
FIG. 6 is a diagram showing a progressive scheme operation timing diagram of a display panel according to an aspect of the present disclosure.

FIG. 6 is a diagram showing a progressive scheme operation timing diagram of a display panel according to an aspect of the present disclosure.

Referring to FIG. 2, FIG. 4 and FIG. 6, in the display panel 20 according to an aspect of the present disclosure, for example, a first pixel is composed of R1, G1, G2, and B1, and a second pixel is composed of R2, G3, G4, and B2. When the panel 20 operates in a progressive scheme, first, the first sub-pixel R1 of the first pixel operates based on the first scan signal Scan #1, second, the first sub-pixel R2 of the second pixel operates based on the third scan signal Scan #3, third, the third sub-pixel B1 of the first pixel operates based on the second scan signal Scan #2, fourth, the third sub-pixel B2 of the second pixel operates based on the fourth scan signal Scan #4.

That is, when the display panel 20 according to an aspect of the present disclosure operates in a progressive scheme, a data signal is applied to a plurality of sub-pixels on 4 rows basis. First, a data signal is applied to pixels of a first row Scan #1. Next, a data signal is applied to pixels of a third row Scan #3. Then, a data signal is applied to pixels of a second row Scan #2. Then, a data signal is applied to pixels of a fourth row Scan #4.

For example, first, the first multiplexer MUX1 is turned on based on a low signal, and the second multiplexer MUX2 is turned off based on a high signal. A low signal is applied to the data line D1_1 of one side (Left), and a high signal is applied to the data line D1_2 of the other side (Right). In this regard, an (n−2)-th first scan signal Scan #1 as a low signal is applied to the scan line for two horizontal periods (2H). Accordingly, the first scan switch T-Sc1 is turned on, and thus, a low signal from the data line D1_1 of one side (Left) is applied to the first sub-pixel R1 of the first pixel for two horizontal periods (2H). Accordingly, the first sub-pixel R1 of the first pixel connected to the first scan line operates to emit light.

Thereafter, the first multiplexer MUX1 is turned off based on a high signal, and the second multiplexer MUX2 is turned on based on a low signal. A low signal is applied to both the data line D1_1 of one side (Left) and the data line D1_2 of the other side (Right). In this regard, an (n−1)-th third scan signal Scan #3 as a low signal is applied to the scan line for two horizontal periods (2H). Accordingly, the third scan switch T-Sc3 is turned on, and thus, a low signal from the data line D1_2 of the other side (Right) is applied to the first sub-pixel R2 of the second pixel for two horizontal periods (2H). Accordingly, the first sub-pixel R2 of the second pixel connected to the third scan line operates to emit light.

Thereafter, the first multiplexer MUX1 is turned on based on a low signal, and the second multiplexer MUX2 is turned off based on a high signal. A high signal is applied to the data line D1_1 of one side (Left), and a low signal is applied to the data line D1_2 of the other side (Right). In this regard, an n-th second scan signal Scan #2 as a low signal is applied to the scan line for two horizontal periods (2H). Accordingly, the second scan switch T-Sc2 is turned on, and thus, a low signal from data line D1_1 of one side (Left) is applied to the third sub-pixel B1 of the first pixel for two horizontal periods (2H). Accordingly, the third sub-pixel B1 of the first pixel connected to the second scan line operates to emit light.

Thereafter, the first multiplexer MUX1 is turned off based on a high signal, and the second multiplexer MUX2 is turned on based on a low signal. A high signal is applied to both the data line D1_1 of one side (Left) and the data line D1_2 of the other side (Right). In this regard, an (n+1)-th fourth scan signal Scan #4 as a low signal is applied to the scan line during two horizontal periods (2H). Accordingly, the fourth scan switch T-Sc4 is turned on, and thus, a low signal from the data line D1_2 of the other side (Right) is applied to the third sub-pixel B2 of the second pixel for two horizontal periods (2H). Accordingly, the third sub-pixel B2 of the second pixel connected to the fourth scan line operates to emit light.

In this regard, the (n−2)-th first scan signal Scan #1 is at low level and for two horizontal periods (2H). When a signal applied to the second multiplexer MUX2 is switched from a high signal to a low signal, the (n−1)-th third scan signal Scan #3 is at a low level state for two horizontal periods (2H). That is, when an operation of the first sub-pixel R1 of the first pixel is switched to an operation of the first sub-pixel R2 of the second pixel, a low level of the (n−2)-th first scan signal Scan #1 and a low level of the (n−1)-th third scan signal Scan #3 overlap each other for a one horizontal period (1H) of the two horizontal periods (2H). Therefore, when an operation of the first sub-pixel R1 of the first pixel is switched to an operation of the first sub-pixel R2 of the second pixel, the flicker phenomenon does not occur.

Further, when an operation of the third sub-pixel B1 of the first pixel is switched to an operation of the third sub-pixel B2 of the second pixel, a low level of the n-th second scan signal Scan #2 and a low level of the (n+1)-th fourth scan signal Scan #4 overlap each other for a one horizontal period (1H) of the two horizontal periods (2H). Therefore, when an operation of the third sub-pixel B1 of the first pixel is switched to an operation of the third sub-pixel B2 of the second pixel, the flicker phenomenon does not occur.

As described above, in the display panel 20 according to an aspect of the present disclosure, when the display panel 20 operates in a progressive scheme, the flicker may not occur when an operation of one sub-pixel is switched to an operation of another sub-pixel.

Figure 7:
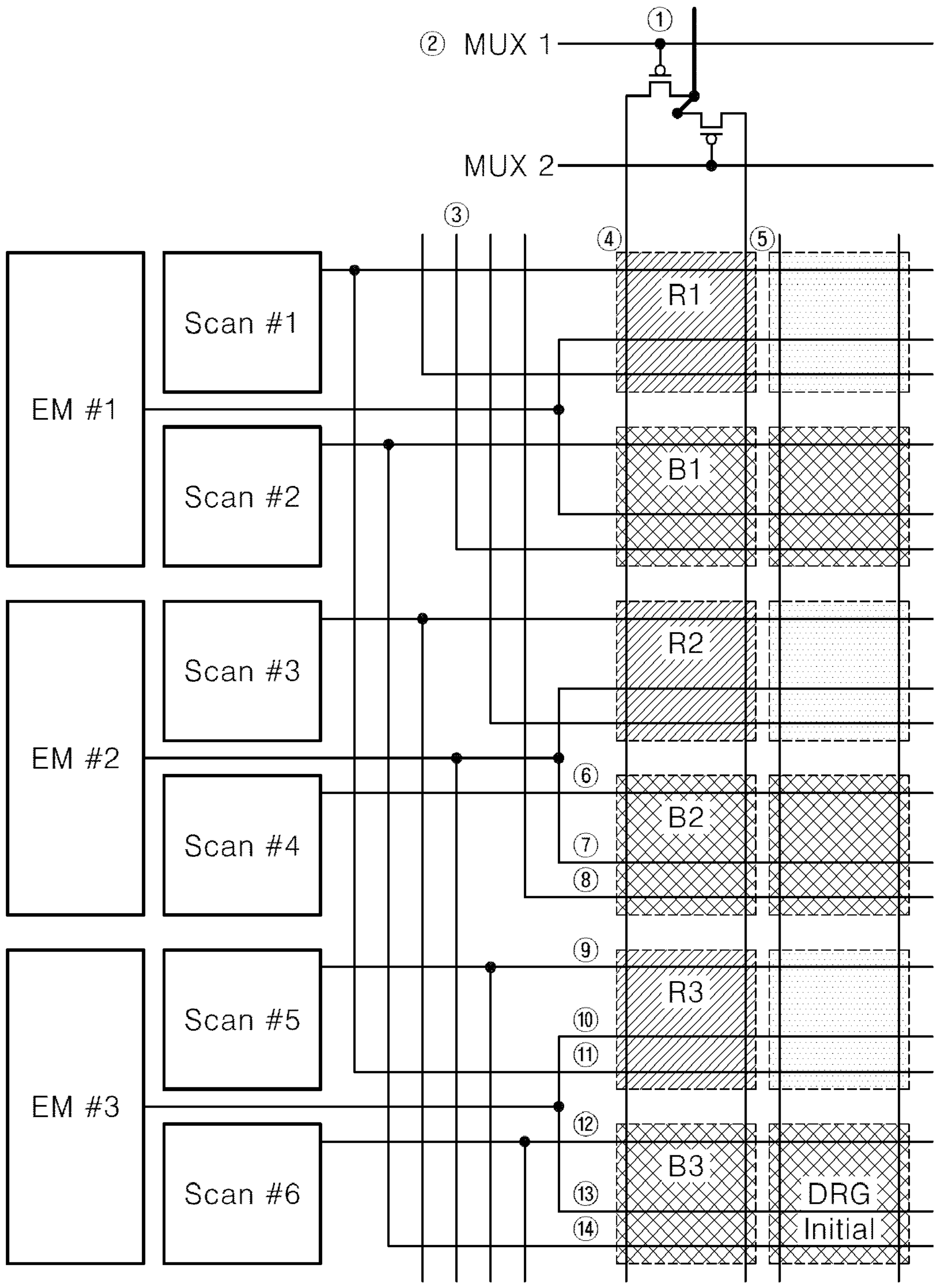
FIG. 7 is a GIP connection diagram of a two data lines and one gate line (2D1G) structure in a display panel according to an aspect of the present disclosure.
Figure 8:
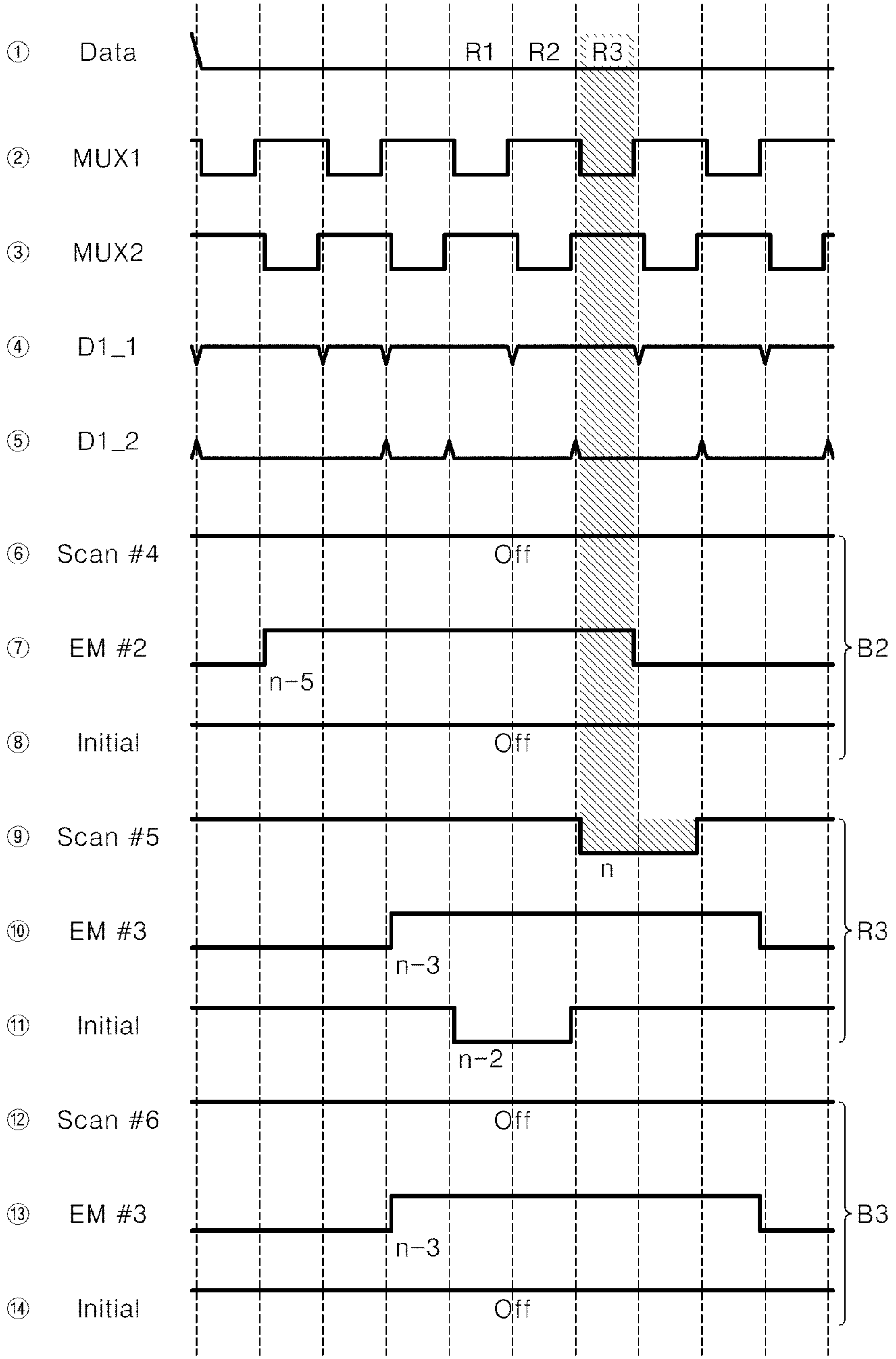
FIG. 8 is a diagram showing a detailed timing diagram of an interlace operation of the GIP connection diagram of FIG. 7.
Figure 9:
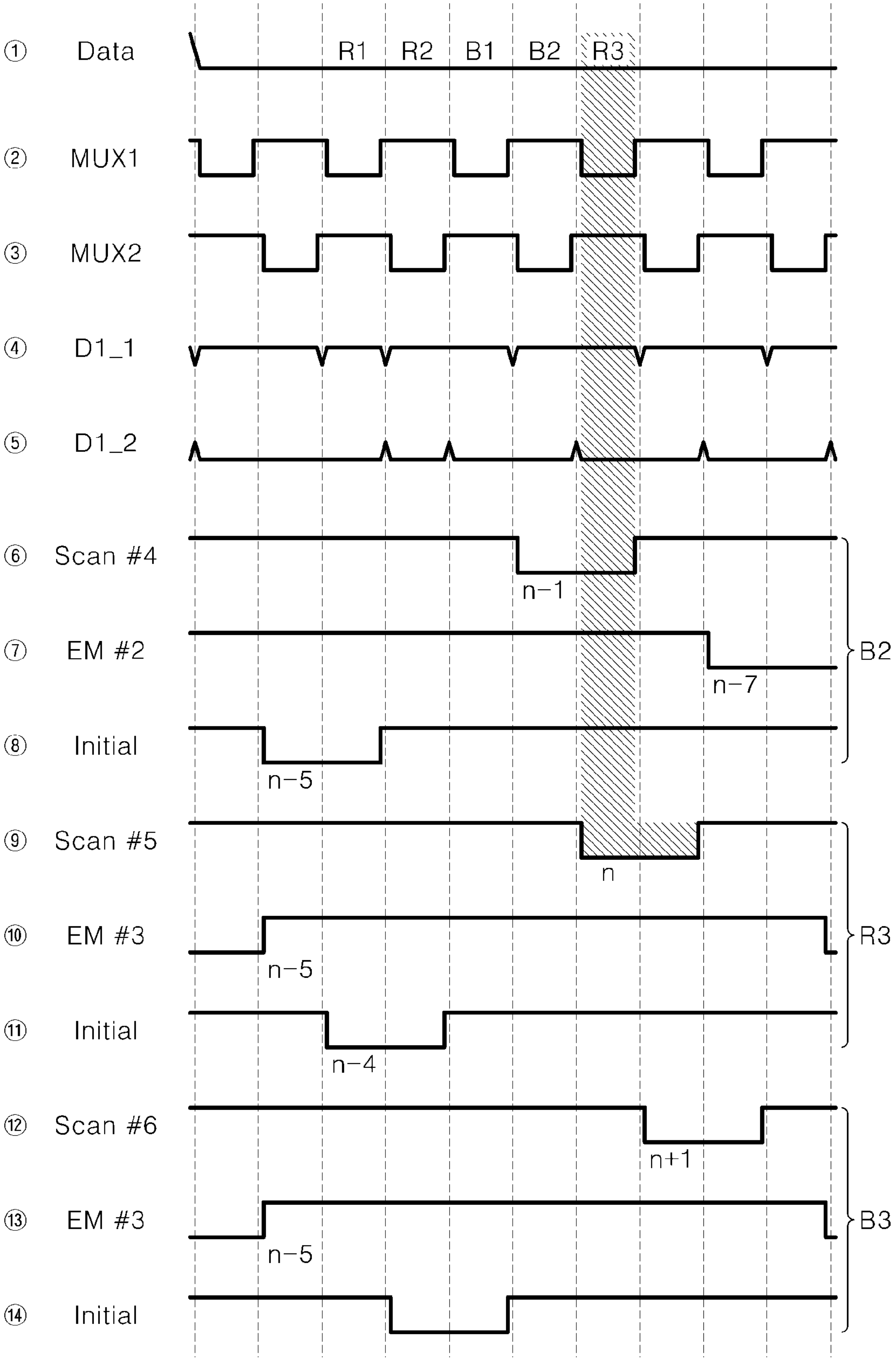
FIG. 9 is a diagram showing a detailed timing diagram of a progressive operation of the GIP connection diagram of FIG. 7.

FIG. 7 is a GIP connection diagram of a 2D1G structure in a display panel according to an aspect of the present disclosure. FIG. 8 is a diagram showing a detailed timing diagram of an interlace operation of the GIP connection diagram of FIG. 7. FIG. 9 is a diagram showing a detailed timing diagram of a progressive operation of the GIP connection diagram of FIG. 7.

Referring to FIG. 7 to FIG. 9, in a display panel 20 according to an aspect of the present disclosure, for the interlace operation, the first scan line Scan #1 may be connected to a first pixel R1 and a fifth pixel R3 arranged in a column direction such that writing & sensing of the first pixel R1 and initialization of the OLED and the gate electrode DRG of the driving thin-film transistor of the fifth pixel R3 are performed at the same time.

That is, when the display panel 20 according to an aspect of the present disclosure operates in an interlace scheme, a scan signal is applied to a plurality of scan lines such that writing and sensing operations of pixels of a first row Scan #1, and an initialization operation of the light-emitting element EL and the gate electrode DRG of the driving switch Tdr of pixels of a fifth row Scan #5 are executed simultaneously.

In FIG. 7, in the column direction, the first pixel is the first sub sub-pixel R1 of the first sub-pixel R, the second pixel is the first sub sub-pixel B1 of the third sub-pixel B, the third pixel is the second sub sub-pixel R2 of the first sub-pixel R, a fourth pixel is the second sub sub-pixel B2 of the third sub-pixel B, the fifth pixel is the third sub-pixel R3 of the first sub-pixel pixel R, and the sixth pixel is the third sub-pixel B3 of the third sub-pixel B.

In FIG. 7, in the same manner as in FIG. 2, the first data line D1_1 is disposed at one side (Left) in each of the sub-pixels R1, B1, R2, B2, R3, and B3 arranged in the column direction, and the second data line D1_2 is disposed at the other side (Right) in each thereof. The first multiplexer MUX1 is connected to the first data line D1_1, and the second multiplexer MUX2 is connected to the second data line D1_2.

In FIG. 8, an interlace operation timing may refer to an operation timing of the display panel 20 operating at a low frequency, for example, 30 Hz.

In FIG. 8, an example in which the first sub sub-pixel R1 of the first sub-pixel R operates in a fifth horizontal period, the second sub sub-pixel R2 operates in a sixth horizontal period, and the third sub sub-pixel R3 operates in a seventh horizontal period is shown.

In FIG. 8, an (n−5)-th second light-emission control signal EM #2 as a high signal is applied in a second horizontal period and then is maintained until a seventh horizontal period and then is converted to a low signal in an eighth horizontal period (⑦). The (n−5)-th second light-emission control signal EM #2 is applied as a high signal, such that the second sub sub-pixel B2 of the third sub-pixel B as the fourth pixel operates to emit light (⑥ to ⑧).

In a seventh horizontal period, the first multiplexer MUX1 is turned on based on a low signal, and the second multiplexer MUX2 is turned off based on a high signal. In this regard, the n-th fifth scan signal Scan #5 as a low signal is applied to the scan line for two horizontal periods (2H), that is, seventh and eighth horizontal periods. Further, an (n−3)-th third light-emission control signal EM #3 is maintained as a high signal for a duration from a fourth horizontal period to a ninth horizontal period, such that the third sub sub-pixel R3 of the first sub-pixel R as the fifth pixel operates to emit light (⑨ to ⑪).

Further, as the (n−3)-th third light-emission control signal EM #3 is applied as a high signal for a duration from the fourth horizontal period to the ninth horizontal period, the third sub sub-pixel B3 of the third sub-pixel B as the sixth pixel operates to emit light (⑫ to ⑭).

Referring to FIG. 9, the progressive operation timing may refer to an operation timing of the display panel 20 operating at a high frequency, for example, 60 Hz to 120 Hz.

In FIG. 9, an example in which the first sub sub-pixel R1 of the first sub-pixel R operates in the third horizontal period, the second sub sub-pixel R2 of the first sub-pixel R operates in the fourth horizontal period, the first sub sub-pixel B1 of the third sub-pixel B operates in the fifth horizontal period, the second sub sub-pixel B2 of the third sub-pixel B operates in the sixth horizontal period, and the third sub sub-pixel R3 of the first sub-pixel R operates in the seventh horizontal period is shown.

In FIG. 9, in the sixth horizontal period, the first multiplexer MUX1 is turned off based on a high signal, and the second multiplexer MUX2 is turned on based on a low signal. In this regard, an (n−1)-th fourth scan signal Scan #4 as a low signal is applied to the scan line for two horizontal periods (2H), that is, the sixth horizontal period and seventh horizontal period. An (n−7)-th second light-emission control signal EM #2 is maintained as a high signal until the eighth horizontal period. Accordingly, the second sub sub-pixel B2 of the third sub-pixel B as the fourth pixel operates to emit light (⑥ to ⑧).

In FIG. 9, in the seventh horizontal period, the first multiplexer MUX1 is turned on based on a low signal, and the second multiplexer MUX2 is turned off based on a high signal. In this regard, an n-th fifth scan signal Scan #5 as a low signal is applied to the scan line for two horizontal periods (2H), that is, the seventh horizontal period and the eighth horizontal period. An (n−5)-th third light-emission control signal EM #3 is maintained as a high signal for a duration from the second horizontal period to a tenth horizontal period. Accordingly, the third sub sub-pixel R3 of the first sub-pixel R as the fifth pixel operates to emit light (⑨ to ⑪).

In this regard, in the seventh horizontal period, the low signal of the (n−1)-th fourth scan signal Scan #4 and the low signal of the n-th fifth scan signal Scan #5 overlap each other for a one horizontal period (1H). Therefore, when an operation of the second sub sub-pixel B2 of the third sub-pixel B as the fourth pixel is switched to an operation of the third sub sub-pixel R3 of the first sub-pixel R as the fifth pixel, the flicker does not occur.

In FIG. 9, in the eighth horizontal period, the first multiplexer MUX1 is turned off based on a high signal, and the second multiplexer MUX2 is turned on based on a low signal. In this regard, an (n+1)-th sixth scan signal Scan #6 as a low signal is applied to the scan line for two horizontal periods (2H), that is, the eighth and ninth horizontal periods. The (n−5)-th third light-emission control signal EM #3 is maintained as a high signal for a duration from the second horizontal period to the tenth horizontal period. Accordingly, the third sub sub-pixel B3 of the third sub-pixel B as the sixth pixel operates to emit light (⑫ to ⑭).

In this regard, in the eighth horizontal period, the low signal of the n-th fifth scan signal Scan #5 and the low signal of the (n+1)-th sixth scan signal Scan #6 overlap each other for a one horizontal period (1H). Therefore, even when an operation of the third sub sub-pixel R3 of the first sub-pixel R as the fifth pixel is switched to an operation of the third sub sub-pixel B3 of the third sub-pixel B as the sixth pixel, the flicker does not occur.

Figure 10:
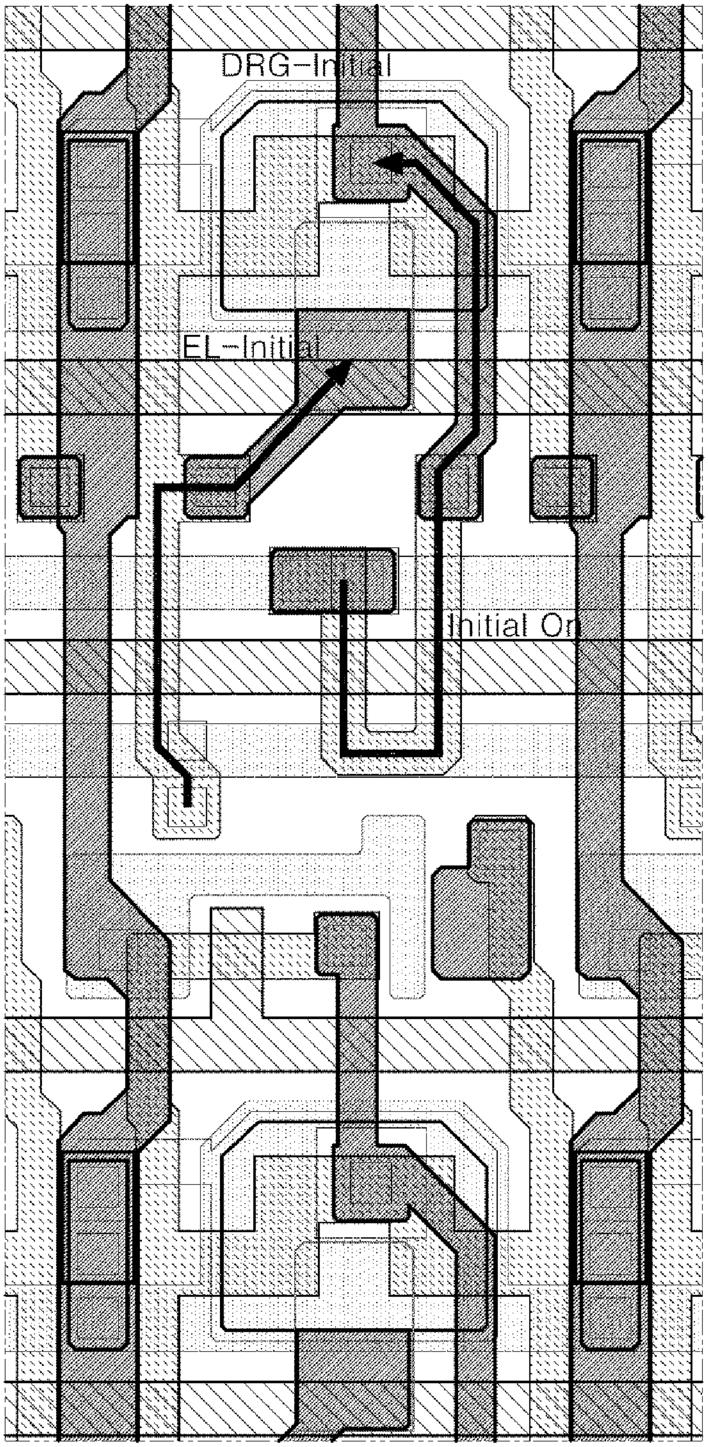
FIG. 10 and FIG. 11 are diagrams showing an example in which a light-emitting diode EL and a gate electrode DRG of a driving thin-film transistor are simultaneously initialized in a display panel according to an aspect of the present disclosure.
Figure 11:
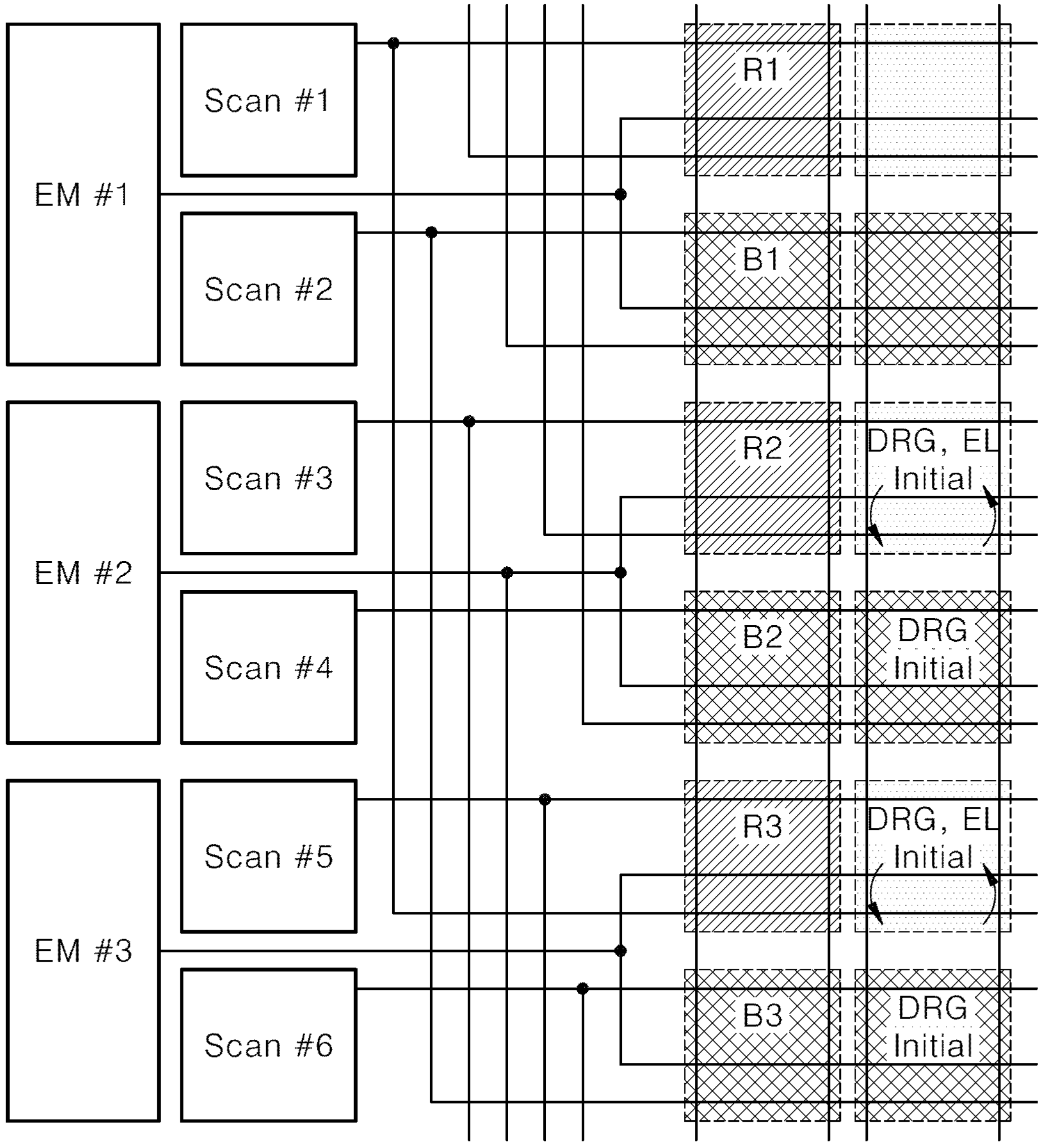

FIG. 10 and FIG. 11 are diagrams showing an example in which a light-emitting diode EL and a gate electrode DRG of a driving thin-film transistor are simultaneously initialized in a display panel according to an aspect of the present disclosure.

Referring to FIG. 10 and FIG. 11, when the display panel 20 according to an aspect of the present disclosure operates in an interlace scheme, the light-emitting diode EL and the gate electrode DGR of the thin-film transistor Tdr in the second sub sub-pixel R2 of the first sub-pixel R may be initialized at the same time. In this regard, the second sub sub-pixel R2 of the first sub-pixel R is connected to the third scan line Scan #3.

Thereafter, the gate electrode DGR of the driving thin-film transistor Tdr in the second sub sub-pixel B2 of the third sub-pixel B connected to the fourth scan line Scan #4 may be initialized.

Further, when the display panel 20 according to an aspect of the present disclosure operates in an interlace scheme, the light-emitting diode EL and the gate electrode DGR of the driving thin-film transistor Tdr in the third sub sub-pixel R3 of the first sub-pixel R may be initialized at the same time. In this regard, the third sub sub-pixel R3 of the first sub-pixel R is connected to the fifth scan line Scan #5.

Thereafter, the gate electrode DGR of the driving thin-film transistor Tdr in the third sub sub-pixel B3 of the third sub-pixel B connected to the sixth scan line Scan #6 may be initialized.

Figure 12:
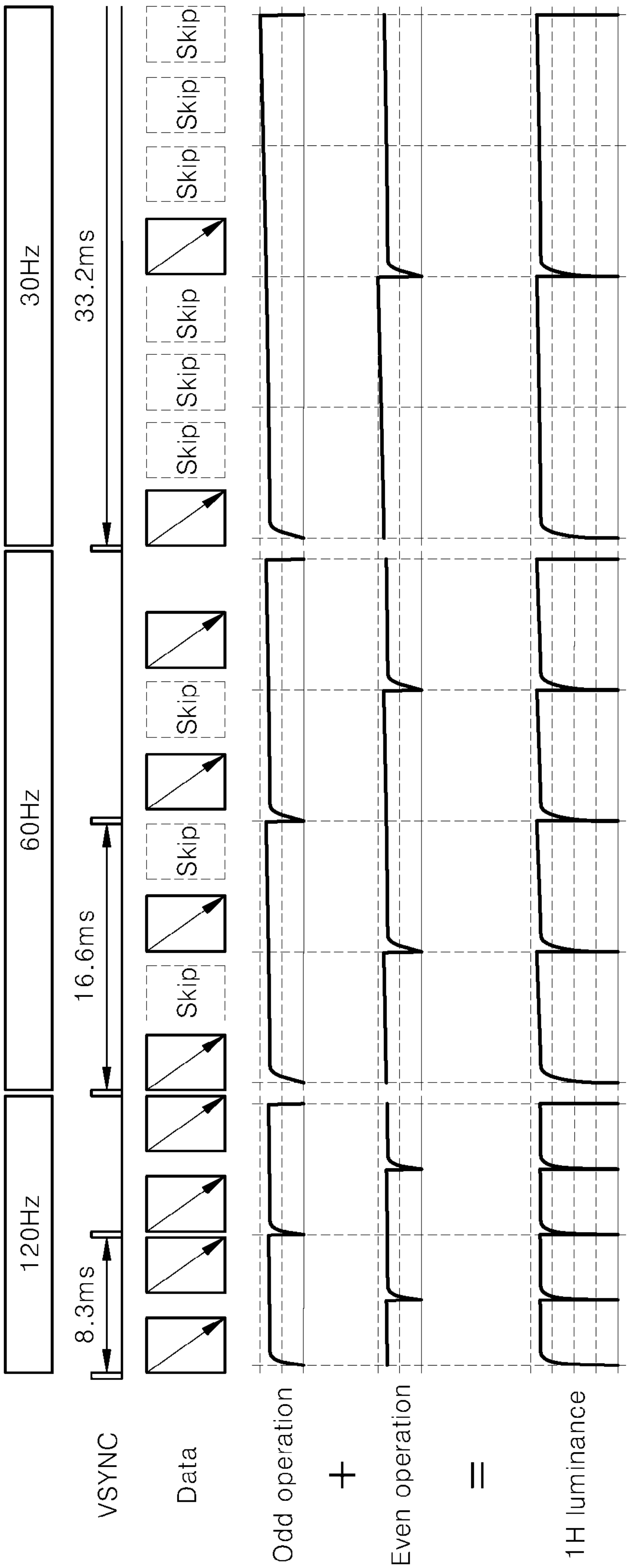
FIG. 12 is a diagram showing an example in which a full interlace operation scheme is performed at both low speed and high speed operations in a display panel according to an aspect of the present disclosure.
Figure 13:
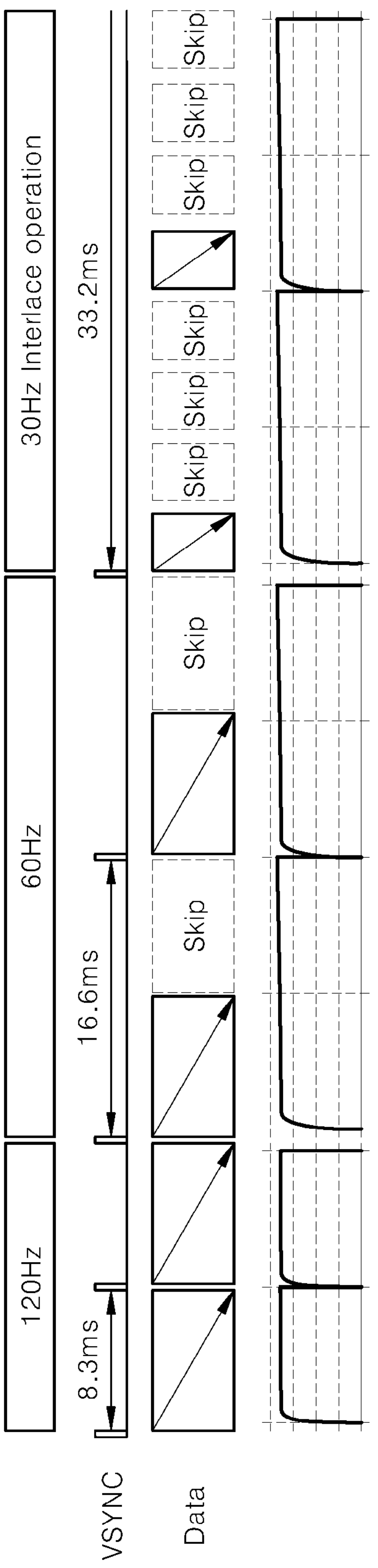
FIG. 13 is a diagram showing an example in which progressive and interlace schemes are performed in a mixed manner in a display panel according to an aspect of the present disclosure.

FIG. 12 is a diagram showing an example in which a full interlace operation scheme is performed at both low speed and high speed operations in a display panel according to an aspect of the present disclosure. FIG. 13 is a diagram showing an example in which progressive and interlace schemes are performed in a mixed manner in a display panel according to an aspect of the present disclosure.

Referring to FIG. 12, when the display panel 20 according to an aspect of the present disclosure operates in an interlace scheme of a high frequency 120 Hz, a vertical synchronization (VSYNC) half frame may be 8.3 ms. In this regard, the odd-numbered operation of the first half frame and the even-numbered operation of the second half frame may allow the luminance to decrease slightly every half frame or ½ half frame. That is, according to the present disclosure, it may be identified that sharp drop in the luminance is significantly reduced compared to a conventional case where the luminance drops sharply after the half (½) frame.

That is, when the display panel 20 according to an aspect of the present disclosure operates in an interlace scheme, a plurality of sub-pixels are divided into an odd-numbered frame group and an even-numbered frame group. The data voltage is applied to the sub-pixels on a half frame basis such that for the first half frame, the data voltage is applied to the sub-pixels corresponding to the odd-numbered frame group, and for the second half frame, the data voltage is applied to the sub-pixels corresponding to the even-numbered frame group. In this regard, the scan signal applied for the two horizontal periods (2H) of the sub-pixel corresponding to the odd-numbered frame group overlaps the scan signal applied for the two horizontal periods (2H) of the sub-pixel corresponding to the even-numbered frame group by one horizontal period (1H).

Further, when the display panel 20 according to an aspect of the present disclosure operates in an interlace scheme of the high frequency 60 Hz, the vertical synchronization (VSYNC) half frame may be 16.6 ms. In this regard, the display panel 20 may activate a first ¼ frame operation, and a second ¼ frame skip for the first half frame and may activate a third ¼ frame operation and a fourth ¼ frame skip for the second half frame. Therefore, it may be identified that an odd-numbered line operation for the first half frame and an even-numbered line operation for the second half frame may allow the luminance to decrease slightly every ½ half frame.

Further, when the display panel 20 according to an aspect of the present disclosure operates in an interlace scheme of a low frequency of 30 Hz, the vertical synchronization (VSYNC) one frame may be 33.2 ms. In this regard, for the first half frame, a first ⅛ frame operation, and a frame skip for a duration from a second ⅛ frame to a fourth ⅛ frame may be performed. For the second half frame, a fifth ⅛ frame operation, and a frame skip for a duration a sixth ⅛ frame to an eighth ⅛ frame may be performed. Therefore, it may be identified that an odd-numbered line operation for the first half frame and an even-numbered line operation for the second half frame may allow the luminance to decrease slightly every one half frame (½ frame).

Referring to FIG. 13, the display panel 20 according to an aspect of the present disclosure may operate in a mixed manner such that the panel 20 may operate in a progressive scheme at high frequencies of 60 Hz and 120 Hz, and in an interlace scheme at low frequencies of 30 Hz.

In FIG. 13, in an 120 Hz operation, one half frame is 8.3 ms. The panel operates for a first half frame and a second half frame. It may be identified that the luminance drops only slightly when a next second half frame operation starts after the first half frame operation.

In FIG. 13, in a 60 Hz operation, one half frame is 16.6 ms. The panel operates for a first half frame and a second half frame such that the panel activates a ¼ frame operation and skips a second ¼ frame for the first half frame, and then activates a third ¼ frame operation and skips a fourth ¼ frame for the second half frame. In this manner, it may be identified that the luminance decreases slightly at a timing when the half frame has elapsed.

In FIG. 13, when the panel operates in a low frequency 30 Hz interlace scheme, one frame is 33.2 ms. A first ⅛ frame operation is performed. A second ⅛ frame to a fourth ⅛ frame is skipped. A fifth ⅛ frame operation is performed. A sixth ⅛ frame to an eighth ⅛ frame is skipped. In this manner, it may be identified that the luminance drops only slightly at a timing when the half frame has elapsed.

Figure 14A:
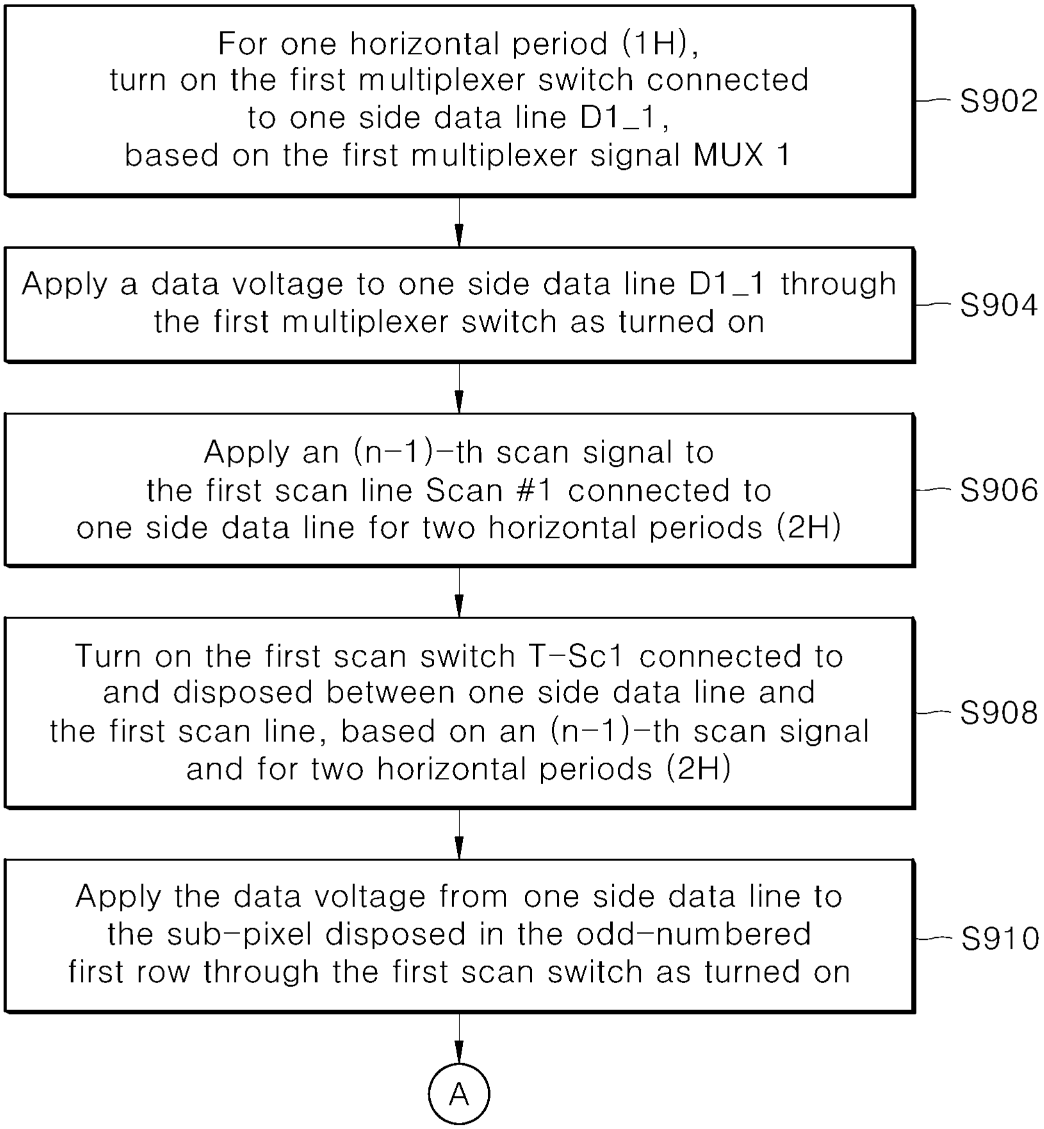
FIG. 14A and FIG. 14B are flowcharts showing an example in which an interlace driving scheme is performed in a method for operating a display device according to an aspect of the present disclosure.
Figure 14B:
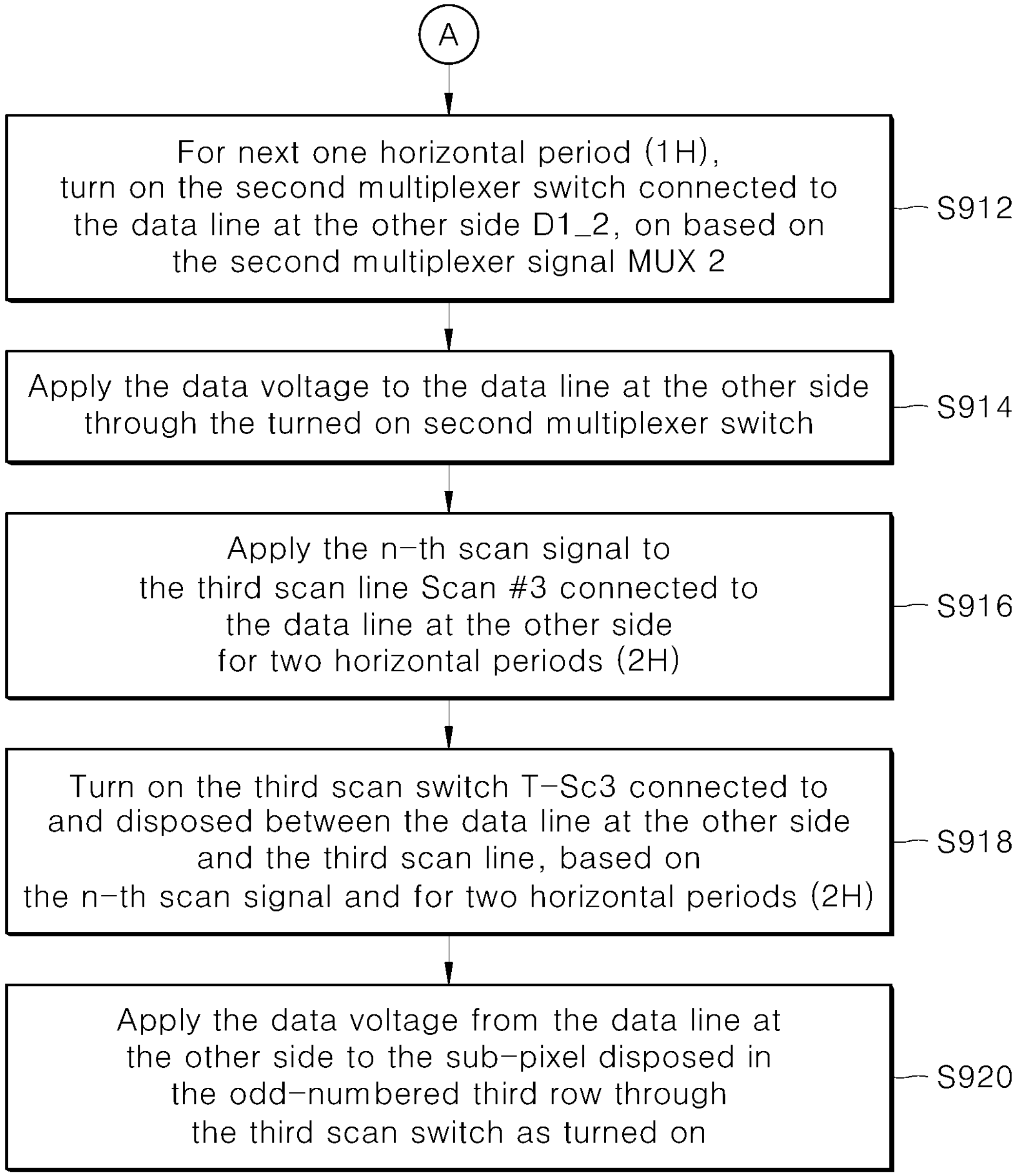
Figure 15A:
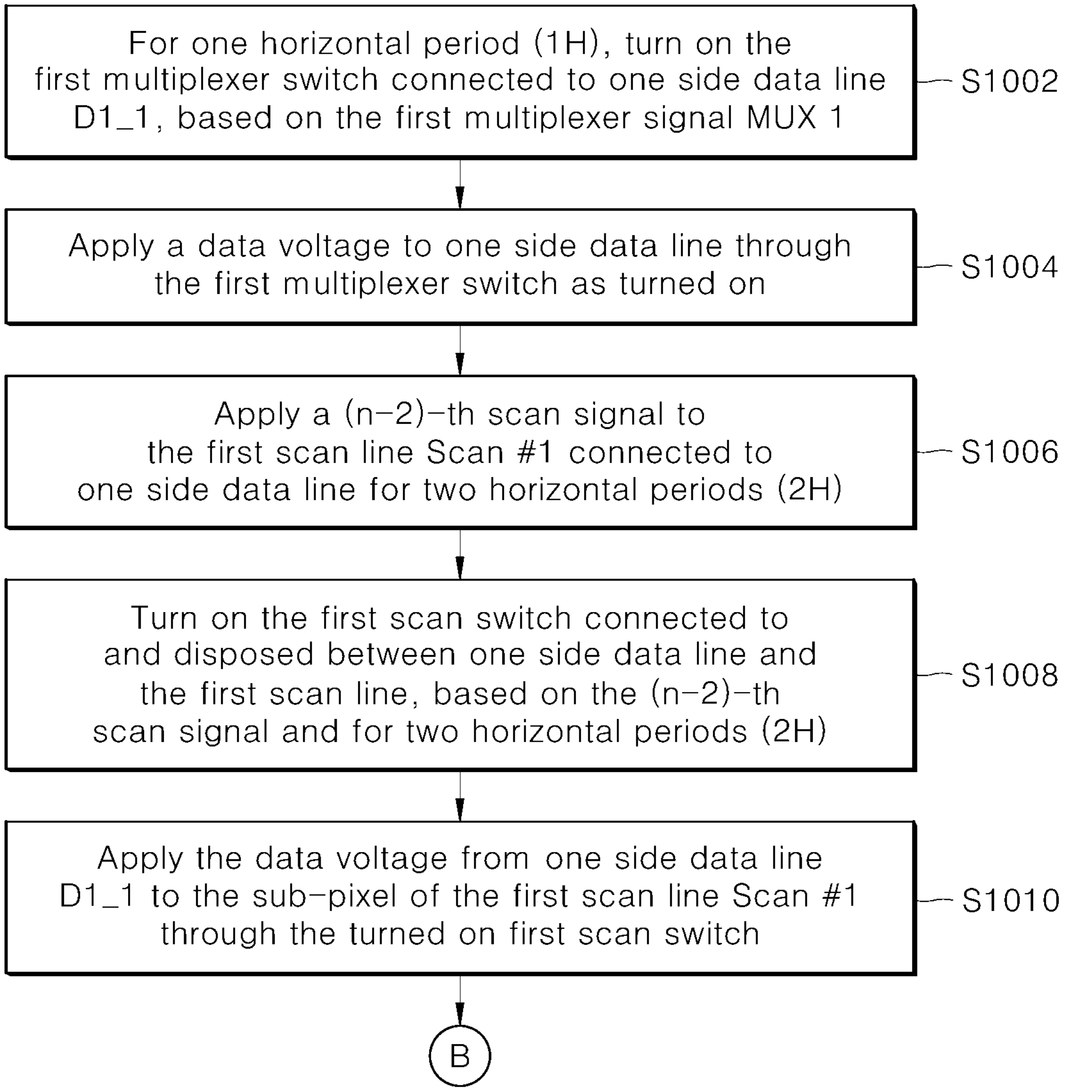
FIG. 15A to FIG. 15D are flowcharts showing an example in which a progressive operation scheme is performed in a method for operating a display device according to an aspect of the present disclosure.
Figure 15B:
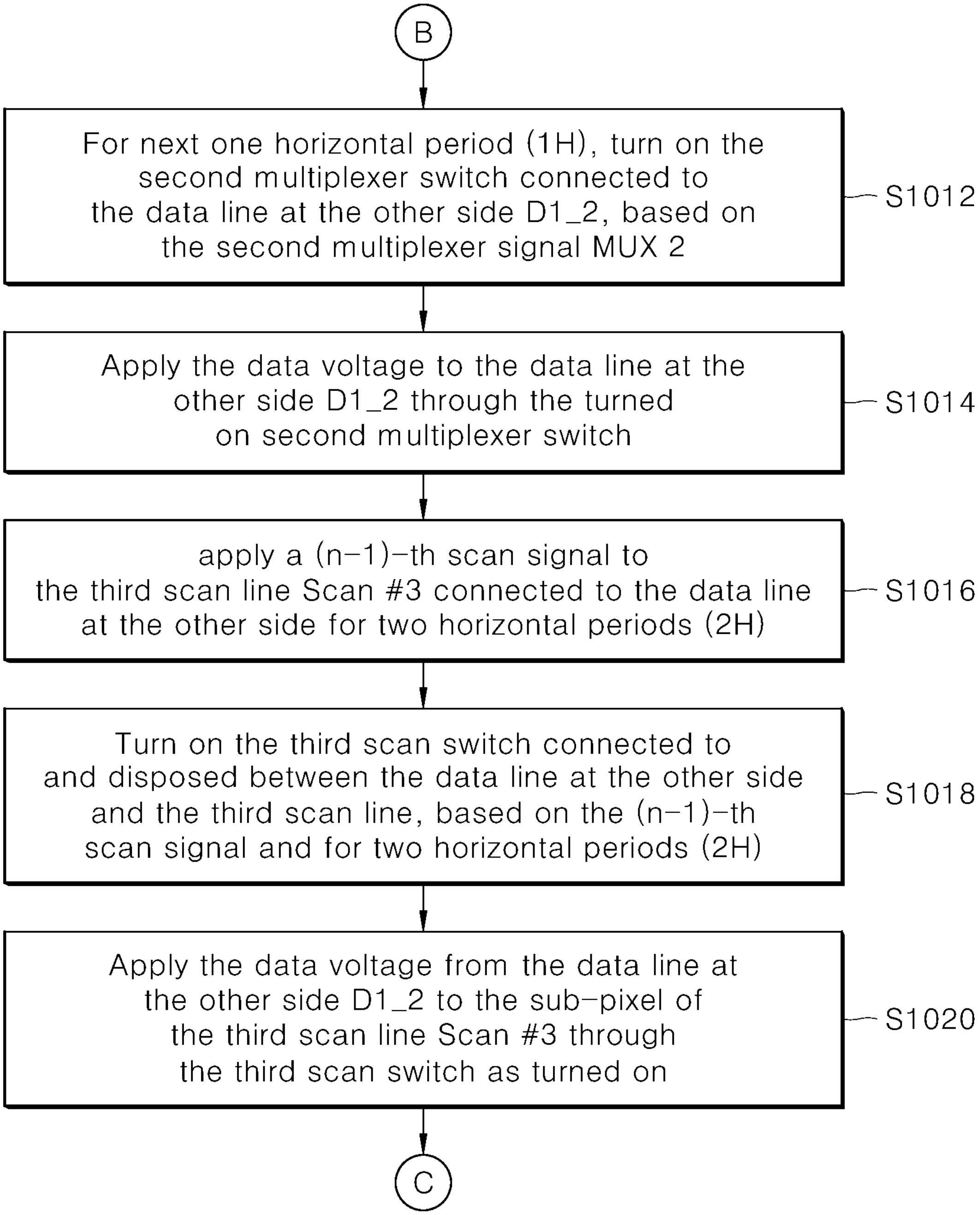
Figure 15C:
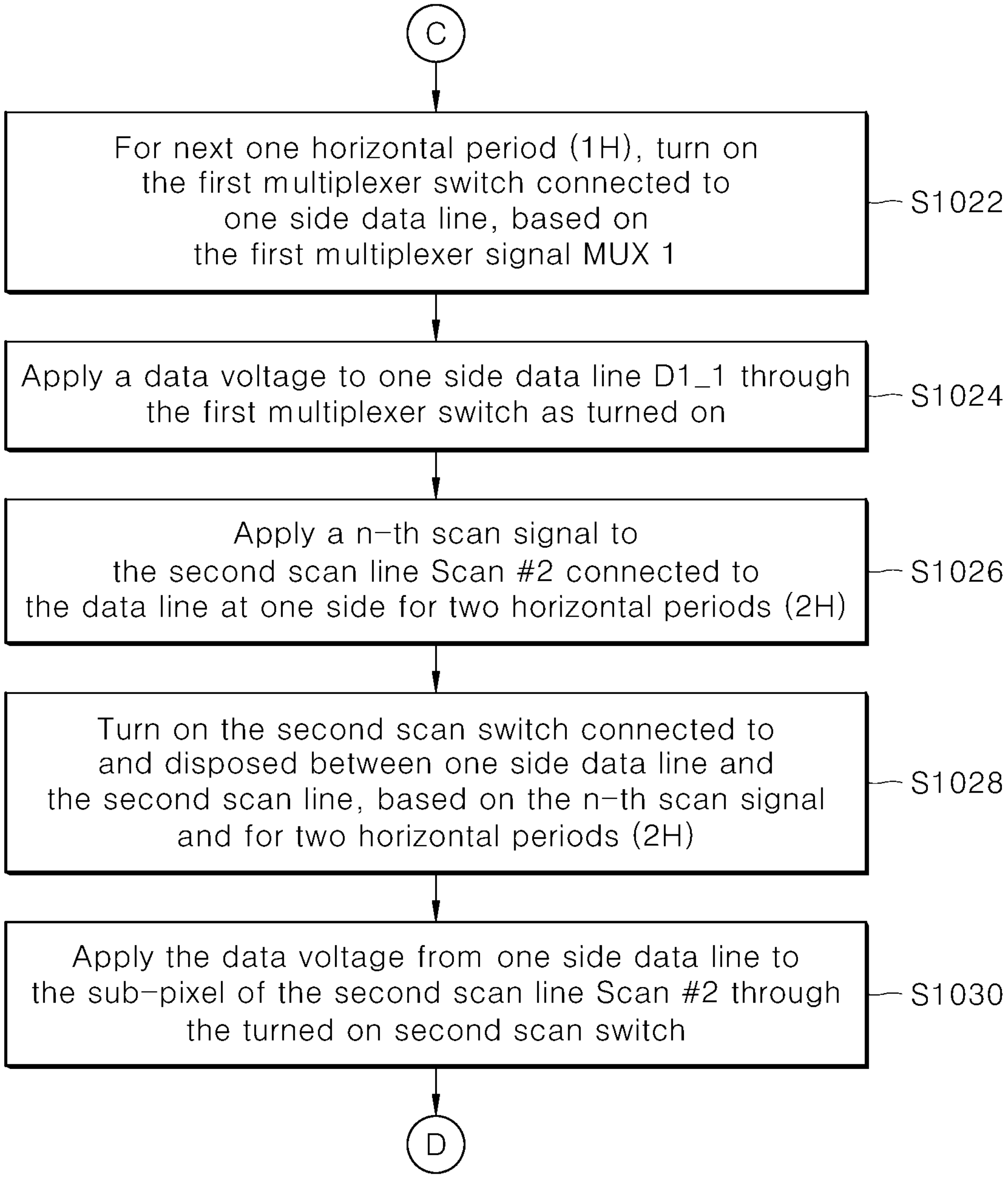
Figure 15D:
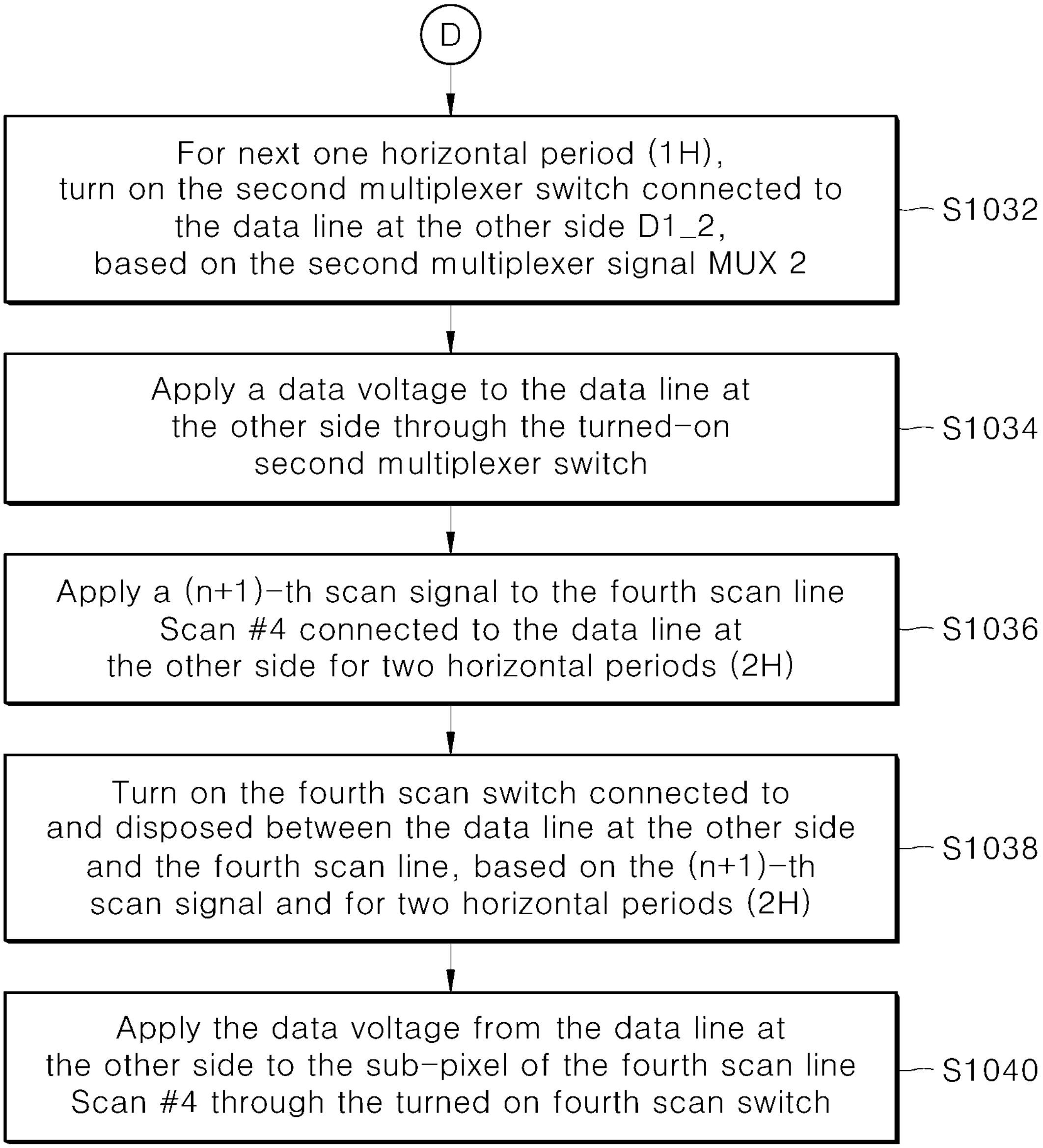

FIG. 14A and FIG. 14B are flowcharts showing an example in which an interlace driving scheme is performed in a method for operating a display device according to an aspect of the present disclosure.

Referring to FIG. 2, FIG. 4, FIG. 5, FIG. 14A and FIG. 14B, in a display device 100 according to an aspect of the present disclosure, for one horizontal period (1H), the first multiplexer switch connected to one side data line D1_1 is turned on based on the first multiplexer signal MUX 1 of a low level in S902.

Thereafter, the display device 100 applies a data voltage to one side data line D1_1 through the first multiplexer switch as turned on in S904.

Then, the display device 100 applies an (n−1)-th scan signal of a low level to the first scan line Scan #1 disposed in the sub-pixel corresponding to the odd-numbered frame connected to one side data line for two horizontal periods (2H) in S906.

Then, in the display device 100, the first scan switch T-Sc1 connected to and disposed between one side data line and the first scan line is turned on based on an (n−1)-th scan signal of a low level and for two horizontal periods (2H) in S908.

Thereafter, the display device 100 applies the data voltage from one side data line to the sub-pixel disposed in the odd-numbered first row through the first scan switch as turned on in S910. For example, the data voltage is applied to the first sub sub-pixel R1 of the first sub-pixel R disposed in the odd-numbered first row, such that the first sub sub-pixel R1 of the red R operates to emit light.

In one example, for next one horizontal period (1H), the display device 100 turns on the second multiplexer switch connected to the data line at the other side D1_2, based on the second multiplexer signal MUX 2 in S912.

Then, the display device 100 applies the data voltage to the data line at the other side through the turned on second multiplexer switch in S914.

Thereafter, the display device 100 applies the n-th scan signal to the third scan line Scan #3 disposed in the sub-pixel corresponding to the even-numbered frame and connected to the data line at the other side for two horizontal periods (2H) in S916.

Then, in the display device 100, the third scan switch T-Sc3 connected to and disposed between the data line at the other side and the third scan line is turned on based on the n-th scan signal and for two horizontal periods (2H) in S918.

Thereafter, the display device 100 applies the data voltage from the data line at the other side to the sub-pixel disposed in the odd-numbered third row through the third scan switch as turned on in S920. For example, the data voltage is applied to the second sub sub-pixel R2 of the first sub-pixel R disposed in the odd-numbered third row, such that the second sub sub-pixel R2 of the red R operates to emit light.

The (n−1)-th scan signal in S906 may overlap the n-th scan signal in S916 for one horizontal period (1H).

Each of the sub-pixel corresponding to the odd-numbered frame and the sub-pixel corresponding to the even-numbered frame may be disposed in an odd-numbered row of the rows of the plurality of sub-pixels.

The second scan switch connected to and disposed between one side data line and the second scan line Scan #2 and the fourth scan switch connected to and disposed between the data line at the other side and the fourth scan line Scan #4 may be in a turned off state, while the first scan switch and the third scan switch may be turned on.

FIG. 15A to FIG. 15D are flowcharts showing an example in which a progressive operation scheme is performed in a method for operating a display device according to an aspect of the present disclosure.

Referring to FIG. 2, FIG. 4, FIG. 6, FIG. 15A to FIG. 15D, for one horizontal period (1H), the display device 100 according to an aspect of the present disclosure turns on the first multiplexer switch connected to one side data line D1_1, based on the first multiplexer signal MUX 1 of a low level in S1002.

Then, the display device 100 applies a data voltage to one side data line through the first multiplexer switch as turned on in S1004.

Thereafter, the display device 100 applies a (n−2)-th scan signal of a low level to the first scan line Scan #1 disposed in the sub-pixel connected to one side data line for two horizontal periods (2H) in S1006.

Thereafter, the display device 100 turns on the first scan switch connected to and disposed between one side data line and the first scan line, based on the (n−2)-th scan signal of the low level and for two horizontal periods (2H) in S1008.

Then, the display device 100 applies the data voltage from one side data line D1_1 to the sub-pixel of the first scan line Scan #1 through the turned on first scan switch in S1010. For example, the data voltage is applied to the first sub sub-pixel R1 of the first sub-pixel R connected to the first scan line, such that the first sub sub-pixel R1 of the red R operates to emit light.

Then, for next one horizontal period (1H), the display device 100 turns on the second multiplexer switch connected to the data line at the other side D1_2, based on the second multiplexer signal MUX 2 of a low level in S1012.

Thereafter, the display device 100 applies the data voltage to the data line at the other side D1_2 through the turned on second multiplexer switch in S1014.

Then, the display device 100 applies a (n−1)-th scan signal of a low level to the third scan line Scan #3 disposed in the sub-pixel connected to the data line at the other side for two horizontal periods (2H) in S1016.

Thereafter, the display device 100 turns on the third scan switch connected to and disposed between the data line at the other side and the third scan line, based on the (n−1)-th scan signal of the low level and for two horizontal periods (2H) in S1018.

Then, the display device 100 applies the data voltage from the data line at the other side D1_2 to the sub-pixel of the third scan line Scan #3 through the third scan switch as turned on in S1020. For example, the data voltage is applied to the second sub sub-pixel R2 of the first sub-pixel R connected to the third scan line, such that the second sub sub-pixel R2 of the red R operates to emit light.

Then, for next one horizontal period (1H), the display device 100 turns on the first multiplexer switch connected to one side data line, based on the first multiplexer signal MUX 1 of a low level in S1022.

Thereafter, the display device 100 applies a data voltage to one side data line D1_1 through the first multiplexer switch as turned on in S1024.

Thereafter, the display device 100 applies a n-th scan signal of a low level to the second scan line Scan #2 disposed in the sub-pixel connected to the data line at one side for two horizontal periods (2H) in S1026.

Thereafter, the display device 100 turns on the second scan switch connected to and disposed between one side data line and the second scan line, based on the n-th scan signal of the low level and for two horizontal periods (2H) in S1028.

Thereafter, the display device 100 applies the data voltage from one side data line to the sub-pixel of the second scan line Scan #2 through the turned on second scan switch in S1030. For example, the data voltage is applied to the first sub sub-pixel B1 of the third sub-pixel B connected to the second scan line, and the first sub sub-pixel B1 of the blue color B operates to emit light.

Then, for next one horizontal period (1H), the display device 100 turns on the second multiplexer switch connected to the data line at the other side D1_2, based on the second multiplexer signal MUX 2 of a low level in S1032.

Thereafter, the display device 100 applies a data voltage to the data line at the other side through the turned-on second multiplexer switch in S1034.

Then, the display device 100 applies a (n+1)-th scan signal of a low level to the fourth scan line Scan #4 disposed in the sub-pixel connected to the data line at the other side for two horizontal periods (2H) in S1036.

Thereafter, the display device 100 turns on the fourth scan switch connected to and disposed between the data line at the other side and the fourth scan line, based on the (n+1)-th scan signal of the low level and for two horizontal periods (2H) in S1038.

Thereafter, the display device 100 applies the data voltage from the data line at the other side to the sub-pixel of the fourth scan line Scan #4 through the turned on fourth scan switch in S1040. For example, the data voltage is applied to the second sub sub-pixel B2 of the third sub-pixel B connected to the fourth scan line, such that the second sub sub-pixel B2 of the blue color B operates to emit light.

In the operation of the display device 100 as above-described, the (n−2)-th scan signal of the low level applied to the first scan line Scan #1 for two horizontal periods (2H) in S1006 overlaps the (n−1)-th scan signal of the low level applied to the third scan line Scan #3 for two horizontal periods (2H) in S1016 for one horizontal period (1H). Therefore, for one horizontal period (1H) for which an operation of one sub-pixel is switched to an operation of another sub-pixel, the scan signals overlap each other. Thus, when an operation of the first sub sub-pixel R1 of the first scan line Scan #1 is switched to an operation of the second sub sub-pixel R2 of the third scan line Scan #3, abrupt luminance change does not occur.

Further, the n-th scan signal of the low level applied to the second scan line Scan #2 for two horizontal periods (2H) in S1026 overlaps with the (n+1)-th scan signal of the low level applied to the fourth scan line Scan #4 for two horizontal periods (2H) in S1036 for one horizontal period (1H). Therefore, for one horizontal period (1H) for which an operation of one sub-pixel is switched to an operation of another sub-pixel, the scan signals overlap each other. Thus, when an operation of the first sub sub-pixel B1 of the second scan line Scan #2 is switched to an operation of the second sub sub-pixel B2 of the fourth scan line Scan #4, abrupt luminance change does not occur.

As described above, according to an aspect of the present disclosure, a display panel 20 includes a plurality of sub-pixels arranged in rows and columns; a plurality of scan lines arranged such that one scan line is disposed in each of the rows of the plurality of sub-pixels; a plurality of data lines arranged such that two data lines are disposed in each of the columns of the plurality of sub-pixels; a first multiplexer MUX1 configured to select a data line D1_1 at one side among the two data lines disposed in each column; and a second multiplexer MUX2 configured to select a data line D1_2 at the other side among the two data lines disposed in each column.

Further, according to an aspect of the present disclosure, a display device 100 includes a display panel including: a plurality of sub-pixels arranged in rows and columns; a plurality of scan lines arranged such that one scan line is disposed in each of the rows of the plurality of sub-pixels; a plurality of data lines arranged such that two data lines are disposed in each of the columns of the plurality of sub-pixels; a first multiplexer MUX1 configured to select a data line D1_1 at one side among the two data lines disposed in each column; a second multiplexer MUX2 configured to select a data line D1_2 at the other side among the two data lines disposed in each column; each of first and second scan switches for switching the scan line disposed in each row to be connected to the data line D1_2 at the one side disposed in each column; and each of third and fourth scan switches for switching the scan line disposed in each row to be connected to the data line D1_2 at the other side disposed in each column; a scan driver for applying a scan signal to the plurality of gate lines; a data driver for applying a data signal to the plurality of data lines; a power supply for providing a high-potential voltage, a low-potential voltage, and an initialization voltage to each of the sub-pixels; and a timing controller for controlling the scan driver and the data driver, wherein pairs of the first and second scan switches and pairs of the third and fourth scan switches are alternatively arranged with each other in the column direction of the sub-pixels and in a zig-zag manner.

As described above, according to the present disclosure, a method for operating a display device is configured as follows: when the display panel operates in the low-speed mode (30 Hz), the device operates in an interlace scheme in which a plurality of sub-pixels are grouped into an odd-numbered frame group and an even-numbered frame group, and a data voltage is applied to sub-pixels corresponding to the odd-numbered frame group for a first half frame, and a data voltage is applied to sub-pixels corresponding to the even-numbered frame group for a second half frame; and when the device operates in the high-speed mode (60 to 120 Hz), the device operates in a progressive scheme in which the device operates on a 4 scan lines basis such that the data voltage may be input to first to fourth scan lines in an order of the first line, the third line, the second line, and the fourth line.

Although the aspects of the present disclosure have been described in more detail with reference to the accompanying drawings, the present disclosure is not necessarily limited to these aspects. The present disclosure may be implemented in various modified manners within the scope not departing from the technical idea of the present disclosure. Accordingly, the aspects disclosed in the present disclosure are not intended to limit the technical idea of the present disclosure, but to describe the present disclosure. the scope of the technical idea of the present disclosure is not limited by the aspects. Therefore, it should be understood that the aspects as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A display panel comprising:

a plurality of sub-pixels arranged in rows and columns;

one scan line disposed in each of the rows of the plurality of sub-pixels;

two data lines disposed in each of the columns of the plurality of sub-pixels;

a first multiplexer configured to select a data line at one side among the two data lines disposed in each column; and a second multiplexer configured to select a data line at another side among the two data lines disposed in each column, wherein the scan signal is applied to the plurality of scan lines such that writing and sensing operations of each of pixels of a first row, and an initialization operation of a light-emitting element and a gate electrode of a driving switch of each of pixels of a fifth row are simultaneously executed.

2. The display panel of claim 1, wherein the display panel further comprises:

each of first and second scan switches for switching the one scan line disposed in each row connected to the data line at the one side disposed in each column; and each of third and fourth scan switches for switching the one scan line disposed in each row connected to the data line at the another side disposed in each column.

3. The display panel of claim 2, wherein the first and second scan switches are respectively disposed in two sub-pixels arranged consecutively in a column direction along the data line at the one side among the plurality of sub-pixels, wherein the third and fourth scan switches are respectively disposed in two sub-pixels arranged consecutively in the column direction along the data line at the another side among the plurality of sub-pixels.

4. The display panel of claim 3, wherein pairs of the first and second scan switches and pairs of the third and fourth scan switches are alternatively arranged with each other in the column direction and in a zig-zag manner.

5. The display panel of claim 1, wherein the first multiplexer includes a first multiplexer switch configured such that a first electrode is connected to the data line at the one side, a gate electrode is connected to a first multiplexer line for applying a first selection signal, and a second electrode is connected to a first power.

6. The display panel of claim 5, wherein the first multiplexer switch is turned on based on the first selection signal applied to the gate electrode through the first multiplexer line, such that the first power applied through the second electrode is applied to the data line at the one side through the first electrode.

7. The display panel of claim 1, wherein the second multiplexer includes a second multiplexer switch having a first electrode connected to the data line of the another side, a gate electrode connected to a second multiplexer line for applying a second selection signal, and a second electrode connected to a first power.

8. The display panel of claim 7, wherein the second multiplexer switch is turned on based on the second selection signal applied to the gate electrode through the second multiplexer line, such that the first power applied through the second electrode is applied to the data line at the another side through the first electrode.

9. A display device comprising:

a display panel including:

a plurality of sub-pixels arranged in rows and columns;

a plurality of scan lines arranged such that one scan line is disposed in each of the rows of the plurality of sub-pixels;

a plurality of data lines arranged such that two data lines are disposed in each of the columns of the plurality of sub-pixels;

a first multiplexer configured to select a data line at one side among the two data lines disposed in each column;

a second multiplexer configured to select a data line at another side among the two data lines disposed in each column;

each of first and second scan switches for switching the scan line disposed in each row connected to the data line at the one side disposed in each column; and each of third and fourth scan switches for switching the scan line disposed in each row connected to the data line at the another side disposed in each column;

a scan driver for applying a scan signal to a plurality of gate lines;

a data driver for applying a data signal to the plurality of data lines;

a power supply for providing a high-potential voltage, a low-potential voltage, and an initialization voltage to each of the plurality of sub-pixels; and a timing controller for controlling the scan driver and the data driver, wherein pairs of the first and second scan switches and pairs of the third and fourth scan switches are alternatively arranged with each other in the column direction of the plurality of sub-pixels and in a zig-zag manner, and wherein the scan signal is applied to the plurality of scan lines such that writing and sensing operations of each of pixels of a first row, and an initialization operation of a light-emitting element and a gate electrode of a driving switch of each of pixels of a fifth row are simultaneously executed.

10. The display device of claim 9, wherein the display panel operates in a progressive scheme at each of 120 Hz and 60 Hz, and operates in an interlace scheme at 30 Hz.

11. The display device of claim 10, wherein, when the display panel operates in the progressive scheme, the data signal is applied to the plurality of sub-pixels on a 4 rows basis such that the data signal is applied to pixels in a first row, then, the data signal is applied to pixels in a third row, then, the data signal is applied to pixels in a second row, and then the data signal is applied to pixels in a fourth row.

12. The display device of claim 10, wherein, when the display panel operates in the interlace scheme, the plurality of sub-pixels are grouped into an odd-numbered frame group and an even-numbered frame group, and a data voltage is applied to sub-pixels corresponding to the odd-numbered frame group for a first half frame, and a data voltage is applied to sub-pixels corresponding to the even-numbered frame group for a second half frame.

13. The display device of claim 12, wherein, when the display panel operates at the interlace scheme, a scan signal applied for two horizontal periods of the sub-pixel corresponding to the odd-numbered frame group overlap each other a scan signal applied for two horizontal periods of the sub-pixel corresponding to the even-numbered frame group by one horizontal period.

14. A method for operating a display device having a display panel that includes one scan line disposed in each of rows of a plurality of sub-pixels, and two data lines respectively disposed at one side and another side and in each of columns of the plurality of sub-pixels, the method comprises:

(a) for a first half frame, turning a first multiplexer switch on to apply a data voltage to a sub-pixel corresponding to an odd-numbered scan line through the data line at one side; and (b) for a second half frame, turning a second multiplexer switch on to a data voltage to a sub-pixel corresponding to an even-numbered scan line through the data line at another side, wherein the scan signal is applied to the plurality of scan lines such that writing and sensing operations of each of pixels of a first row, and an initialization operation of a light-emitting element and a gate electrode of a driving switch of each of pixels of a fifth row are simultaneously executed.

15. The method of claim 14, wherein (a) includes:

(a-1) for one horizontal period, turning on the first multiplexer switch connected to the data line at one side, based on a first multiplexer signal;

(a-2) applying the data voltage to the data line at one side through the turned-on first multiplexer switch;

(a-3) applying an (n−1)-th scan signal to a first scan line disposed in a sub-pixel corresponding to an odd-numbered frame and connected to the data line at one side for two horizontal periods; and (a-4) turning on a first scan switch connected to and disposed between the data line at one side and the first scan line, based on the (n−1)-th scan signal and for two horizontal periods; and (a-5) applying the data voltage from the data line at one side to a sub-pixel disposed in an odd-numbered first row through the turned-on first scan switch.

16. The method of claim 15, wherein (b) includes:

(b-1) for a next one horizontal period, turning on a second multiplexer switch connected to the data line at the another side, based on a second multiplexer signal;

(b-2) applying the data voltage to the data line at the another side through the turned-on second multiplexer switch;

(b-3) applying an n-th scan signal to a third scan line disposed in a sub-pixel corresponding to an even-numbered frame and connected to the data line at the another side for two horizontal periods;

(b-4) turning on a third scan switch connected to and disposed between the data line at the another side and the third scan line, based on the n-th scan signal and for two horizontal periods; and (b-5) applying the data voltage from the data line at the another side to a sub-pixel disposed in an odd-numbered third row through the turned-on third scan switch.

17. The method of claim 16, wherein the (n−1)-th scan signal overlaps with the n-th scan signal for one horizontal period.

18. The method of claim 16, wherein a second scan switch connected to and disposed between the data line at the one side and a second scan line and a fourth scan switch connected to and disposed between the data line at the another side and a fourth scan line are in a turned off state while the first and third scan switches are in a turned on state.

19. The method of claim 14, wherein each of the sub-pixel corresponding to the odd-numbered frame and the sub-pixel corresponding to the even-numbered frame is disposed in an odd-numbered row of rows of the plurality of sub-pixels.

20. A method for operating a display device having a display panel that includes one scan line disposed in each of rows of a plurality of sub-pixels, and two data lines respectively disposed at one side and another side and in each of columns of the plurality of sub-pixels, the method comprises:

(a) turning on a first scan switch connected to the data line at the one side so as to apply a data voltage to a sub-pixel of a first scan line;

(b) turning on a third scan switch connected to the data line at the another side so as to apply a data voltage to a sub-pixel of a third scan line;

(c) turning on a second scan switch connected to the data line at the one side so as to apply a data voltage to a sub-pixel of a second scan line; and (d) turning on a fourth scan switch connected to the data line at the another side so as to apply a data voltage to a sub-pixel of a fourth scan line, wherein the scan signal is applied to the plurality of scan lines such that writing and sensing operations of each of pixels of a first row, and an initialization operation of a light-emitting element and a gate electrode of a driving switch of each of pixels of a fifth row are simultaneously executed.

21. The method of claim 20, wherein the (a) includes:

(a-1) for one horizontal period, turning on a first multiplexer switch connected to the data line at the one side, based on a first multiplexer signal;

(a-2) applying a data voltage to the data line at the one side through the turned-on first multiplexer switch;

(a-3) applying a (n−2)-th scan signal to a first scan line disposed in a sub-pixel connected to the data line at the one side for two horizontal periods;

(a-4) turning on the first scan switch connected to and disposed between the data line at the one side and the first scan line, based on the (n−2)-th scan signal and for two horizontal periods; and (a-5) applying the data voltage from the data line at the one side to the sub-pixel of the first scan line through the turned-on first scan switch.

22. The method of claim 21, wherein the (b) includes:

(b-1) for next one horizontal period, turning on a second multiplexer switch connected to the data line at the another side, on based on a second multiplexer signal;

(b-2) applying a data voltage to the data line at the another side through the turned-on second multiplexer switch;

(b-3) applying an (n−1)-th scan signal to the third scan line disposed in a sub-pixel connected to the data line at the another side for two horizontal periods;

(b-4) turning on the third scan switch connected to and disposed between the data line at the another side and the third scan line, based on the (n−1)-th scan signal and for two horizontal periods (2H); and (b-5) applying the data voltage from the data line at the another side to the sub-pixel of the third scan line through the turned-on third scan switch.

23. The method of claim 22, wherein the (n−2)-th scan signal applied to the first scan line overlaps with the (n−1)-th scan signal applied to the third scan line for one horizontal period.

24. The method of claim 20, wherein the (c) includes:

(c-1) for next one horizontal period (1H), turning on a first multiplexer switch connected to the data line at the one side, based on a first multiplexer signal;

(c-2) applying a data voltage to the data line at the one side through the turned-on first multiplexer switch;

(c-3) applying an n-th scan signal to the second scan line disposed in a pixel connected to the data line at the one side for two horizontal periods (2H);

(c-4) turning on the second scan switch connected to and disposed between the data line at the one side and the second scan line, based on the n-th scan signal and for two horizontal periods; and (c-5) applying the data voltage from the data line at the one side to the sub-pixel of the second scan line through the turned-on second scan switch.

25. The method of claim 24, wherein the (d) includes:

(d-1) for next one horizontal period, turning on a second multiplexer switch connected to the data line at the another side, based on a second multiplexer signal;

(d-2) applying a data voltage to the data line at the another side through the turned-on second multiplexer switch;

(d-3) applying an (n+1)-th scan signal to the fourth scan line disposed in a pixel connected to the data line at the another side for two horizontal periods;

(d-4) turning on the fourth scan switch connected to and disposed between the data line at the another side and the fourth scan line, based on the (n+1)-th scan signal and for two horizontal periods; and (d-5) applying the data voltage from the data line at the another side to the sub-pixel of the fourth scan line through the turned-on fourth scan switch.

26. The method of claim 25, wherein the n-th scan signal applied to the second scan line overlaps with the (n+1)-th scan signal applied to the fourth scan line for one horizontal period.

* * * * *